US012105931B2

(12) United States Patent
Al Majid et al.

(10) Patent No.: US 12,105,931 B2
(45) Date of Patent: *Oct. 1, 2024

(54) CONTEXTUAL ACTION MECHANISMS IN CHAT USER INTERFACES

(71) Applicant: Snap Inc., Santa Monica, CA (US)

(72) Inventors: Newar Husam Al Majid, New York, NY (US); Devin Doty, Brooklyn, NY (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/647,334

(22) Filed: Jan. 6, 2022

(65) Prior Publication Data
US 2022/0206646 A1 Jun. 30, 2022

Related U.S. Application Data

(63) Continuation of application No. 16/947,920, filed on Aug. 24, 2020, now Pat. No. 11,249,621, which is a
(Continued)

(51) Int. Cl.
*G06F 3/0482* (2013.01)
*G06F 3/04842* (2022.01)
(Continued)

(52) U.S. Cl.
CPC ........ *G06F 3/0482* (2013.01); *G06F 3/04842* (2013.01); *G06T 3/20* (2013.01);
(Continued)

(58) Field of Classification Search
CPC ..................................................... G06F 3/0482
(Continued)

(56) References Cited

U.S. PATENT DOCUMENTS 6,038,295 A 3/2000 Mattes
6,493,006 B1 12/2002 Gourdol et al.
(Continued)

FOREIGN PATENT DOCUMENTS

CA 2887596 A1 7/2015

OTHER PUBLICATIONS

Juli Clover, "How to Use Messages' Tapback, Screen Effects and Bubble Effects in iOS 10" Sep. 13, 2016, 9 pages (Year: 2016).*
(Continued)

*Primary Examiner* — Reza Nabi
(74) *Attorney, Agent, or Firm* — Schwegman Lundberg & Woessner, P.A.

(57) ABSTRACT

A graphical user interface (GUI) for a messaging or chat application on a mobile electronic device launches, responsive to user-selection of a particular message cell in the GUI, a contextual message overlaid on an underlying scrollable message board or list. The action menu comprises a preview area displaying a preview of message content of the selected message cell, and further comprises one or more user-selectable action items for executing respective corresponding user actions with respect to the selected message. The preview area is automatically scaled and positioned dependent on one or more attributes of the selected message cell.

19 Claims, 21 Drawing Sheets

Related U.S. Application Data continuation of application No. 15/837,985, filed on Dec. 11, 2017, now Pat. No. 10,782,852.

(60) Provisional application No. 62/432,693, filed on Dec. 11, 2016.

(51) Int. Cl.
*G06T 3/20* (2006.01)
*G06T 3/40* (2006.01)
*G06F 3/0488* (2022.01)
*H04L 51/04* (2022.01)
*H04L 51/52* (2022.01)

(52) U.S. Cl.
CPC ............. *G06T 3/40* (2013.01); *G06F 3/0488* (2013.01); *G06T 2200/24* (2013.01); *H04L 51/04* (2013.01); *H04L 51/52* (2022.05)

(58) Field of Classification Search
USPC ........................................................ 715/758
See application file for complete search history.

(56) References Cited

U.S. PATENT DOCUMENTS

| | | | |
|---|---|---|---|
| 6,980,909 | B2 | 12/2005 | Root et al. |
| 7,036,083 | B1* | 4/2006 | Zenith ................ H04N 21/4782 348/E7.071 |
| 7,173,651 | B1 | 2/2007 | Knowles |
| 7,411,493 | B2 | 8/2008 | Smith |
| 7,535,890 | B2 | 5/2009 | Rojas |
| 7,546,602 | B2* | 6/2009 | Hejlsberg ................ G06F 9/54 717/114 |
| 8,010,903 | B2* | 8/2011 | Dieberger ............ G06F 16/904 715/764 |
| 8,131,597 | B2 | 3/2012 | Hudetz |
| 8,150,922 | B2* | 4/2012 | Griffin ................ H04L 61/00 709/206 |
| 8,199,747 | B2 | 6/2012 | Rojas et al. |
| 8,332,475 | B2 | 12/2012 | Rosen et al. |
| 8,533,284 | B2* | 9/2013 | Shoemaker ............ H04L 67/02 709/204 |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,304,675 | B2 | 4/2016 | Lemay et al. |
| 9,443,227 | B2 | 9/2016 | Evans et al. |
| 9,489,661 | B2 | 11/2016 | Evans et al. |
| 9,491,134 | B2 | 11/2016 | Rosen et al. |
| 9,569,102 | B2 | 2/2017 | Lemay |
| 10,782,852 | B1* | 9/2020 | Al Majid ................ H04L 51/10 |
| 10,904,193 | B1* | 1/2021 | Al Majid ............ H04L 51/224 |
| 11,249,621 | B2 | 2/2022 | Al Majid et al. |
| 11,397,523 | B2* | 7/2022 | Langholz ............ G06F 3/04847 |
| 2003/0112278 | A1 | 6/2003 | Driskell |
| 2008/0189622 | A1* | 8/2008 | Sanchez ................ G06Q 10/06 715/752 |
| 2010/0095239 | A1* | 4/2010 | McCommons ..... G06F 3/04855 715/803 |
| 2010/0271288 | A1* | 10/2010 | Srinivasan ............ G06F 3/1454 345/2.2 |
| 2010/0306249 | A1* | 12/2010 | Hill ...................... G06F 16/9535 707/769 |
| 2011/0087990 | A1* | 4/2011 | Ng ........................ G06F 3/0481 715/773 |
| 2011/0202598 | A1 | 8/2011 | Evans et al. |
| 2012/0209924 | A1 | 8/2012 | Evans et al. |
| 2013/0019182 | A1* | 1/2013 | Gil ........................ G06F 3/0482 715/834 |
| 2014/0040828 | A1 | 2/2014 | Choi et al. |
| 2014/0280288 | A1 | 9/2014 | Hwang et al. |
| 2014/0310617 | A1* | 10/2014 | Pascal .................... H04L 51/04 715/758 |
| 2015/0007063 | A1* | 1/2015 | DeGrazia .............. G06F 3/0481 715/753 |
| 2015/0130740 | A1* | 5/2015 | Cederlund ............. G02B 27/01 345/173 |
| 2015/0180808 | A1 | 6/2015 | Moisa |
| 2015/0253923 | A1 | 9/2015 | Cho |
| 2016/0259413 | A1 | 9/2016 | Anzures et al. |
| 2016/0259497 | A1 | 9/2016 | Foss et al. |
| 2017/0046025 | A1* | 2/2017 | Dascola ................ G06F 3/016 |
| 2017/0093774 | A1 | 3/2017 | Arastafar et al. |
| 2017/0257338 | A1 | 9/2017 | Zhang et al. |
| 2017/0336960 | A1* | 11/2017 | Chaudhri ................ H04L 51/18 |
| 2018/0095653 | A1* | 4/2018 | Hasek ................ G06F 3/04883 |
| 2019/0124021 | A1* | 4/2019 | DeMattei ............. G06F 3/0481 |
| 2019/0394149 | A1* | 12/2019 | McNeill ................ H04L 51/56 |
| 2020/0145242 | A1* | 5/2020 | Libin .................. H04L 12/1822 |
| 2020/0379614 | A1* | 12/2020 | Al Majid ................ G06T 3/40 |
| 2021/0389852 | A1* | 12/2021 | Desserrey ............. G06Q 50/01 |

OTHER PUBLICATIONS

"U.S. Appl. No. 15/837,985, Non Final Office Action mailed Dec. 31, 2019", 11 pgs.

"U.S. Appl. No. 15/837,985, Notice of Allowance mailed May 18, 2020", 10 pgs.

"U.S. Appl. No. 15/837,985, Response filed Apr. 30, 2020 to Non Final Office Action mailed Dec. 31, 2019", 11 pgs.

"U.S. Appl. No. 16/947,920, Non Final Office Action mailed Apr. 29, 2021", 10 pgs.

"U.S. Appl. No. 16/947,920, Notice of Allowance mailed Sep. 17, 2021", 7 pgs.

"U.S. Appl. No. 16/947,920, Response filed Aug. 30, 2021 to Non Final Office Action mailed Apr. 29, 2021", 14 pgs.

Clover, Juli, "How to Use Messages' Tapback, Screen Effects and Bubble Effects in iOS 10", MacRumors, [Online] Retrieved from the Internet: <URL: https://www.macrumors.com/how-to/ios-10-messages-tapback-effects/>, (Sep. 13, 2016), 9 pgs.

Horowitz, Paul, "How to Use Tapback in Messages on iPhone and iPad", OSX Daily, [Online] Retrieved from the Internet: <URL: http://osxdaily.com/2016/12/09/use-tapback-messages-ios/>, (Dec. 9, 2016), 8 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

CONTEXTUAL ACTION MECHANISMS IN CHAT USER INTERFACES

CLAIM OF PRIORITY

This application is a continuation of U.S. patent application Ser. No. 16/947,920, filed on Aug. 24, 2020, which is a continuation of U.S. patent application Ser. No. 15/837,985, filed on Dec. 11, 2017, which claims the benefit of priority to U.S. Provisional Application Ser. No. 62/432,693, filed on Dec. 11, 2016, the benefit of priority of each of which is claimed hereby, and each of which is incorporated by reference herein in their entireties.

BACKGROUND

Graphical user interfaces (GUIs) for social media applications, such as chat applications or other messaging applications, on mobile electronic devices often present messages in a scrollable series of chronologically arranged messages, with each message being displayed in a respective message cell. Applications where contextual actions (e.g., copying or saving messages) are available to the user for respective messages display respective action items, being user interface (UI) elements that are selectable by the user to perform corresponding contextual actions with respect to a respective message. Additionally, each message has associated metadata which may be of interest to the user.

Because screen space is at a premium in such mobile applications, the sizing and location of message content, action items, and/or metadata in message application GUIs are often problematic.

Figure 1:
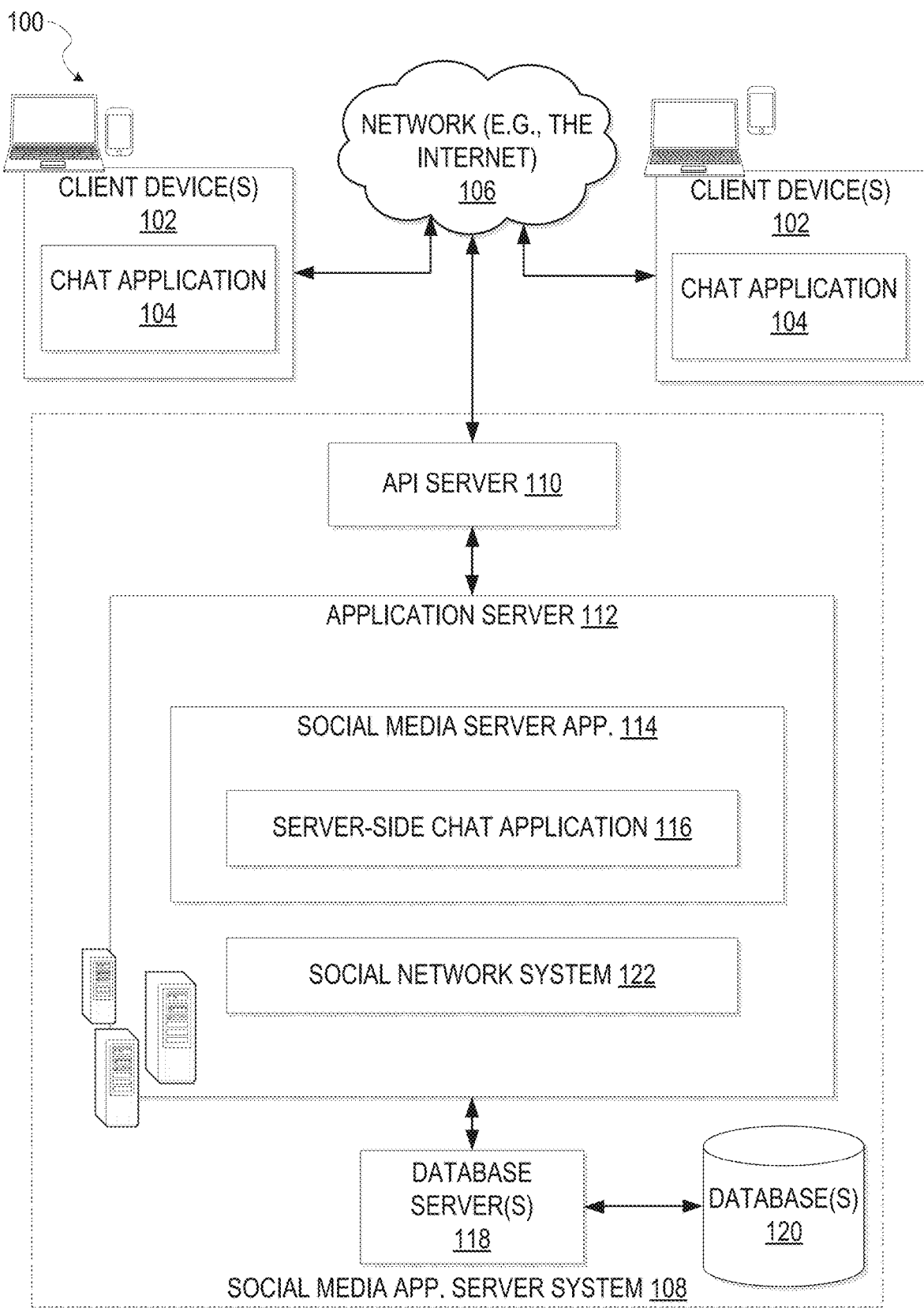
FIG. 1 is a schematic block diagram illustrating a networked system for providing a social media platform that provides chat functionality among multiple users using different respective user devices, according to an example embodiment.

The headings provided herein are merely for convenience and do not necessarily affect the scope or meaning of the terms used.

INTRODUCTION

One aspect of the disclosure provides for a GUI for a messaging or chat application on a mobile electronic device, wherein the GUI is configured to, responsive to user-selection of a particular message cell in the GUI, launch a contextual message overlaid on the underlying scrollable message board or list. The action menu comprises a preview area displaying a preview of message content of the selected message cell, and further comprises one or more user-selectable action items for executing respective corresponding user actions with respect to the selected message.

Note that the contextual message is overlaid on the underlying message board shown prior to its launch, for example being a pop-up or fly-out menu, pane, or window in which the message preview and action items are shown. See, for example, the screenshot of FIG. 3B. Such a contextual menu displaying within the original user interface environment is to be distinguished from a menu or user interface displayed on a new screen in temporary on-screen replacement of the original UI environment in which the message cell is selected.

Although various aspects of the disclosure is described further here and with respect to a chat application, it is to be appreciated that the described techniques can be analogously employed in other social media messaging applications, including but not limited to: messaging applications (including direct messaging applications, SMS platforms, or the like; GUIs in social media applications that present a feed or message board presenting social media items (such as messages, status updates, and post) from multiple users. The description that follows and the border disclosed techniques and principles are thus to be understood in some embodiments to extend to such applications as well.

Methods, systems, and devices in accordance with some embodiments of the disclosure provides for implementation of techniques to automatically scale and/or at least some elements of the action menu dependent on one or more user interface variables, for example according to one or more attributes of the selected message cell. In some embodiments, the message preview area is automatically sized and/or positioned as a function of one or more attributes of the selected message cell. In such instances, an on-screen size of the preview area is thus variable dependent on the one or more message cell attributes. In some embodiments, the message cell attributes that determine preview area size includes one or more of a vertical height of the selected chat cell, and an on-screen position of the selected chat cell, when selected.

In a particular example embodiment, the contextual action menu's preview area is automatically sized such that the user selectable action items are (except for non-standard instances, as will be discussed later herein) a constant vertical distance or a constant vertical proportion of the message cell from a reference position associated with the selected chat cell. In some embodiments, the reference position is a geometric value associated with the selected chat cell, in specific example embodiments being a vertical center of the chat cell. In other embodiments, the reference position may be implemented as the on-screen position of haptic contact by the user in selecting the chat cell.

In some embodiments, a vertical position of a particular component of the action menu is determined as a function of one or more attributes of the selected chat cell. In some embodiments, the vertical position of the preview area is determined based at least in part on the vertical position of the selected message cell. In a particular example embodiment, the preview area is centered on a vertical center of the selected chat cell. In some such embodiments, the preview area is in addition variable in size as a function of the on-screen scroll position of the selected chat cell. In this regard compare, for example, the righthand screenshots in FIGS. 8A-8D.

The message preview area may display one or more thumbnail images in instances where the selected chat message is selected chat message includes media content. Instead, or in addition, the message preview area can display a preview of message text.

Launching or surfacing of the contextual action menu in includes highlighted display of the action menu by relatively dimming the intensity of the background chat messages. In some embodiments, the action menu includes indicia that display metadata not otherwise visible with respect to the selected chat message. Such metadata may include, for example, identification of users who opened the chat message, a timestamp for posting of the chat message, a countdown timer to indicate remaining time for availability of an ephemeral message (e.g., a radial pie element that progressively decreases in circumferential extent).

In some embodiments, different action items can automatically be surfaced in the action menu dependent on a number of different variables and/or context. For example, if the selected message includes an address, the action menu may include an action item for launching a navigation app with respect to the address. In such instances, geographic location of the user device and the address can in some instances determine whether or not a navigation option is displayed. Thus, for example, if the address is further away from the current location of the device than a predefined threshold distance, no navigation option is displayed. Other example action items includes copying of a message, saving of a message, tapping to view a media item, and the like.

DETAILED DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

First, a network architecture and environment within which certain aspects of the disclosure may be implemented will be described with reference to FIGS. 1 and 2, after which various features of the disclosure will be described in greater detail with reference to FIGS. 3-11. Finally, an example software architecture and machine that can be used for implemented various aspects of the disclosure will be described with reference to FIGS. 12 and 13.

System Architecture and Operating Environment

FIG. 1 is a block diagram showing an example social media platform system 100 for exchanging data (e.g., social media items or messages and associated content) over a network. In this description, items communicated from one user to one or more other users via a social media application or platform, as well as items uploaded or provided by users to a social media application or platform for availability to or consumption by other users via the social media application or platform, are referred to as messages. In this particular example embodiment, the social media platform system 100 is configured to provide chat functionality allowing multiple users to communicate via a common chat platform. As will be described further below, the system 100 further provides for chat application GUI that provides a contextual action menu displayable with in a main chat board, with one or more components of the contextual action menu being dynamically variable in position and/or size based on one or more attributes of a selected message with respect to which the action menu is to be displayed.

The social media platform system 100 includes multiple client devices 102 (also referred to herein as user devices), each of which hosts a number of applications, including a chat application 104. In some embodiments, the chat application 104 is provided by or forms part of a client-side social media application that provides at least some social media functionalities additional to the chat functionalities described herein. Each chat application 104 is communicatively coupled to other instances of the chat application 104 and a social media application server system 108 via a network 106 (e.g., the Internet).

Accordingly, each chat application 104 is able to communicate and exchange data with another chat application 104 and with the social media application server system 108 via the network 106. The data exchanged between social media client applications 104, and between a chat application 104 and the social media application server system 108, includes functions (e.g., commands to invoke functions) as well as payload data (e.g., text, audio, video, or other multimedia data).

The social media application server system 108 provides server-side functionality via the network 106 to a particular chat application 104. While certain functions of the social media platform system 100 are described herein as being performed by either a chat application 104 or by the social media application server system 108, it will be appreciated that the location of certain functionality either within the chat application 104 or the social media application server system 108 is a design choice. For example, it may be technically preferable to initially deploy certain technology and functionality within the social media application server system 108, but to later migrate this technology and functionality to the chat application 104 where a client device 102 has a sufficient processing capacity.

The social media application server system 108 supports various services and operations that are provided to the chat application 104. Such operations include transmitting data to, receiving data from, and processing data generated by the chat application 104. This data may include message content, client device information, geolocation information, media annotation and overlays, message content persistence conditions, social network information, and live event information, as examples. Data exchanges within the social media platform system 100 are invoked and controlled through functions available via user interfaces (UIs) of the chat application 104.

Turning now specifically to the social media application server system 108, an Application Program Interface (API) server 110 is coupled to, and provides a programmatic interface to an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the chat application 104 in order to invoke functionality of the application server 112. The API server 110 exposes various functions supported by the application server 112, including account registration; login functionality; the sending of messages, via the application server 112, from a particular chat application 104 to another chat application 104; the sending of media files (e.g., images or video) from a chat application 104 to the social media server application 114, and for possible access by another chat application 104; the setting of a collection of media data (e.g., a story or gallery); the retrieval of a list of friends of a user of a client device 102; the retrieval of such collections; the retrieval of messages and content; the adding and deletion of friends to a social graph; the location of friends within a social graph; and opening an application event (e.g., relating to the chat application 104).

The application server 112 hosts a number of applications and subsystems, including a social media server application 114, a server-side chat application 116 (in this example embodiment forming part of the social media server application 114), and a social network system 122. The social media server application 114 implements a number of message processing technologies and functions particularly related to the aggregation and other processing of content (e.g., textual and multimedia content) included in messages received from multiple instances of the chat application 104. Other processor and memory intensive processing of data may also be performed server-side by the social media server application 114, in view of the hardware requirements for such processing.

The social network system 122 supports various social networking functions and services and makes these functions and services available to the social media server application 114. To this end, the social network system 122 maintains and accesses an entity graph within the database 120. Examples of functions and services supported by the social network system 122 include the identification of other users of the social media platform system 100 with whom a particular user has relationships or is "following." In particular example embodiments, the social network system 122 may additionally store information regarding the identity of users in multiple different chat groups, for example including a list of chat groups of which each user is a member. It will be appreciated that a chat group is a set of three or more users able to access and contribute to a common chat board or thread for the respective chat group. In some embodiments, messages contributed by respective users to the chat platform are ephemeral messages, each ephemeral message having a predefined limited availability period after which the message is made unavailable for viewing via the chat applications 104 of other users.

The application server 112 is communicatively coupled to a database server 118, which facilitates access to a database 120 in which is stored data associated with messages processed by the social media server application 114.

Note that, in this example embodiment, the chat application 104 is a client application that executes on the client device 102. In other embodiments, similar functionalities can be provided instead, or in addition, by a web application executing on the client device 102. Such a web application provides a thin client in which the majority of processing is performed server-side by the social media application server system 108. The example embodiments described below with respect to presentation and control of a GUI, control functions and calculations with respect to presentation and behavior of the GUI are performed client-site on the client device 102. In other embodiments, such as where the relevant functionalities provided by a web application executing on the client device 102, Julie control functions may in part or in whole be performed client-side by the server-side chat application 116.

Figure 2:
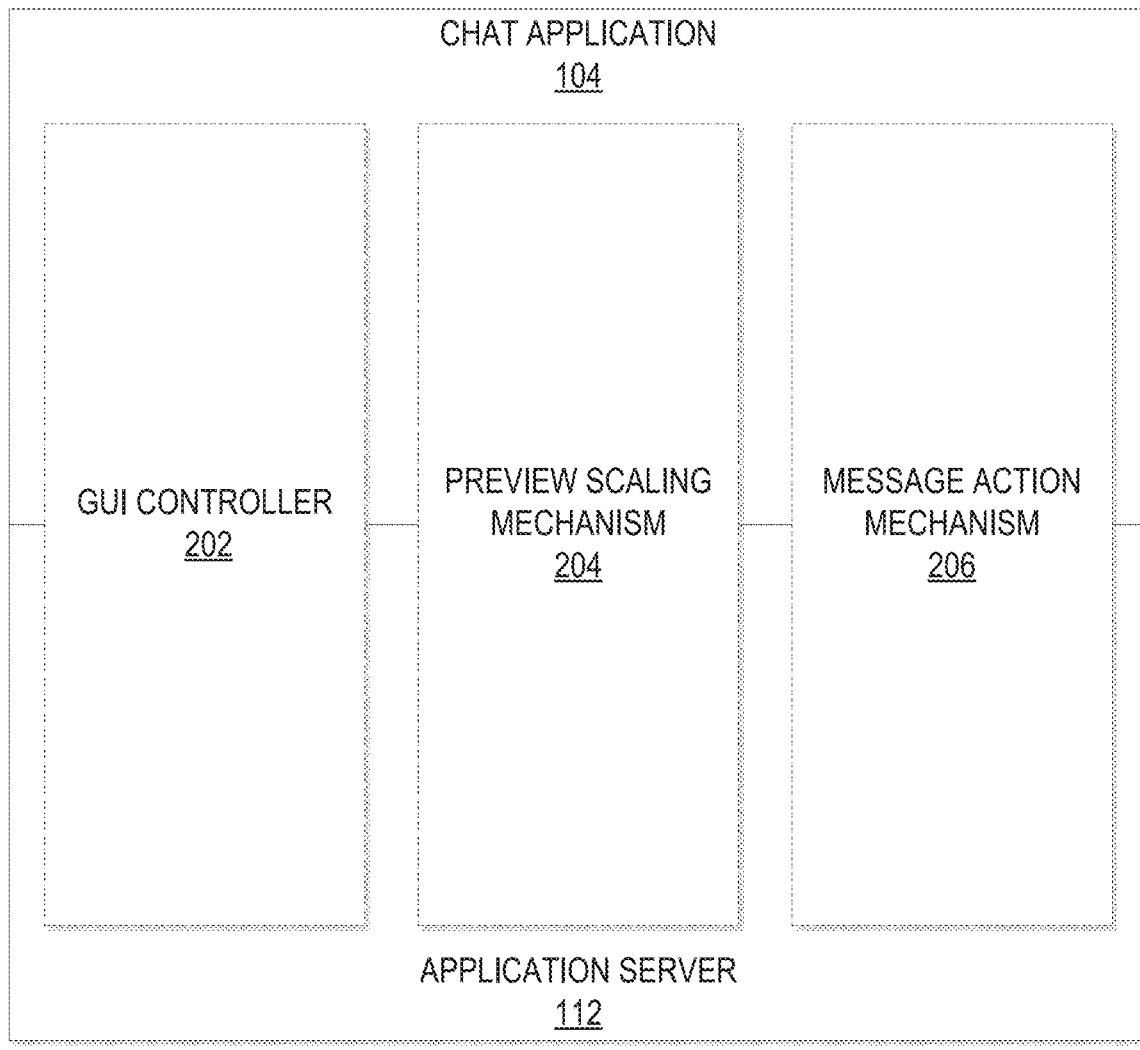
FIG. 2 is a schematic diagram illustrating a network architecture for providing a messaging platform, according to an example embodiment.

FIG. 2 is block diagram illustrating further details regarding the social media platform system 100, according to example embodiments. Specifically, the social media platform system 100 is shown to comprise the chat application 104 and the application server 112, which in turn embody a number of subsystems. These subsystems include, but are not limited to, vaguely controller 114, a preview scaling mechanism 204, and a message action mechanism 206. The functionalities of these mechanisms will be evident from the description that follows.

Figure 3A:
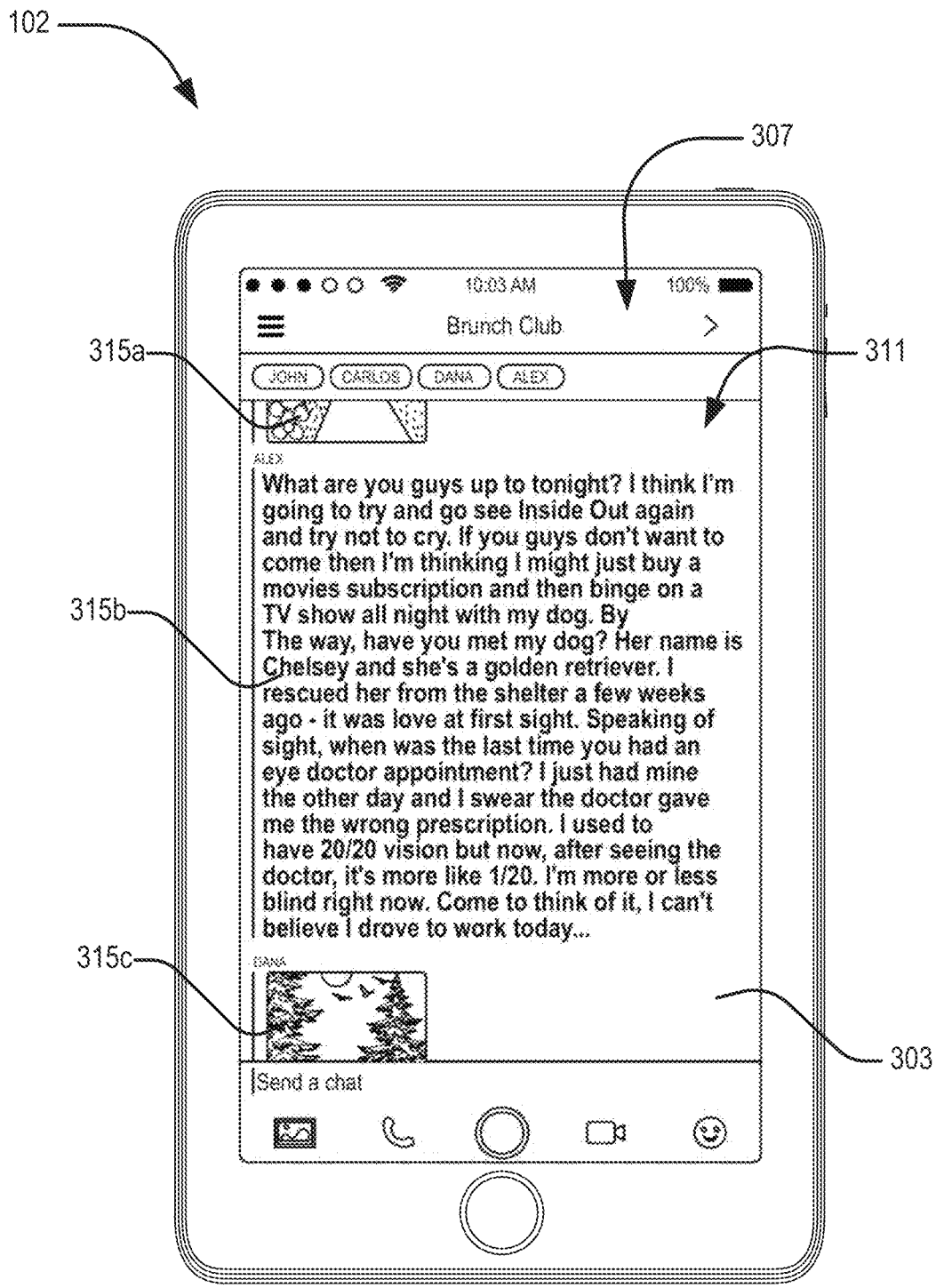
FIGS. 3A and 3B are a schematic front views of a mobile user device in accordance with an example embodiment, FIG. 3A showing a chat user interface, and FIG. 3B showing the same chat user interface with an overlaid contextual action menu displayed responsive to user selection of a particular message cell in the chat interface.

FIG. 3 shows a mobile user device 102 in the example form of a mobile phone on which is hosted a client chat application 104 as described previously. The mobile device 102 has a touchscreen 303 that, in conventional fashion, provides dual functionalities of serving as a display screen and providing a tactile input mechanism for receiving tactile user inputs in the form of manual taps or press-and-hold engagements.

FIG. 3 further shows an example embodiment of a GUI 307 for the chat application 104. The GUI 307 comprises a chat board 311 generated by the GUI controller 114. The chat board 311 comprises a vertically extending series of messages in respective chat cells 315. Note that in this description, the terms horizontally and vertically are used not to indicate a direction relative to the Earth's gravitational field, but instead indicates directions with respect to orientation of a display such as the touchscreen 303. Thus, an up-down direction within the GUI 307 is understood as the vertical dimension, and a side-to-side direction within the GUI 307 is understood as the horizontal dimension. The chat cells 315 of the example chat board 311 are chronologically arranged in series, with newer messages being displayed lower in the series of chat cells 315. The chat board 311 is vertically scrollable responsive to a tactile input by the user.

Note that each chat cell 315 contains message content representing the payload of the corresponding message. In the example embodiment of FIG. 3, message 315a and message 315c have message content provided by video media in the form of a photographic thumbnail. Message 315c is a text message having textual message content. Note that the chat cells 315 does not include any user interface elements that are selectable to perform contextual actions with respect to the associated messages. Instead, such action items are provided by a contextual action window or menu 350 (FIG. 3B) that can be lost by selection of a target chat cell 315. Note also that each chat cell 315 includes no metadata other than the name of the corresponding sender. Again, such metadata is in some embodiments presented on the contextual action menu 350.

Figure 3B:
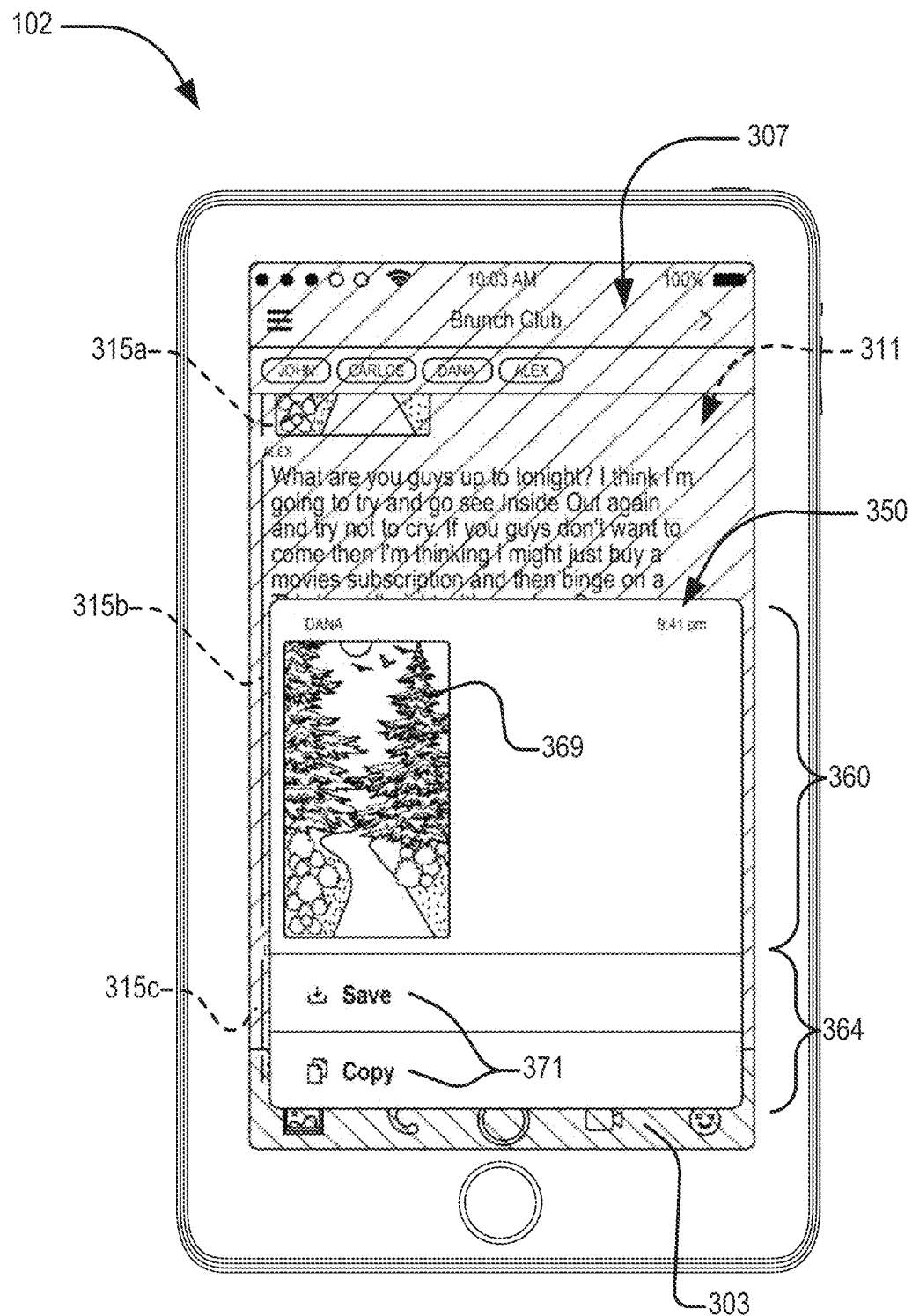

Turning now to FIG. 3B, therein is shown a version of the GUI 307 in which a contextual action menu 350 has been launched with respect to a particular selected chat cell 315c in the chat board 311. The contextual action menu 350 is in this example embodiment presented as a pop-up window or pane that is overlaid on the underlying chat board 311 such that the chat board 311 is only partially obscured by the action menu 350. The foregrounded contextual action menu 350 is highlighted by rendering the background (consisting of the exposed portion of the chat board 311 in its state when the chat cell 315c was selected) in a dimmed mode in which it is displayed at a lower intensity than before surfacing of the action menu 350, thus being at a lower intensity than the action menu 350. Note that the chat board 311 is in this example embodiment deactivated when the action menu 350 is displayed, so that it is not receptive to chat cell selection or scrolling inputs.

Note that the horizontal extent of the action menu 350 spans almost the entirety of the horizontal width of the touchscreen 303 (in this example embodiment spanning about 95% of the touchscreen width). In the description that follows, it will be noted that the vertical position of the action menu 350 is variable as a function of one or more attributes of the selected chat cell 315 to which it pertains, but that the horizontal width and position of the action menu 350 stays substantially constant from one instance to another.

The action menu 350 in this embodiment comprises two distinct panes or areas, namely a preview area 360 and, immediately below it, an actions area 364. The preview area 360 includes a preview of the message content of the selected chat cell 315c, in the example embodiment of FIG. 3B comprising a preview thumbnail 369. As will be described at length below, the disclosure provides for displaying the preview area 360 in a variable position and/or at a variable size, depending on one or more attributes of the selected chat cell 315. In this embodiment, the vertical extent and the vertical position of the preview area 360 is a function of the vertical position of the selected chat cell 315, and the vertical size of the selected chat cell 315. Principles and techniques for determining preview area size and position will be described in greater detail below with reference to FIGS. 6-11.

The actions area 364 displays one or more action items 371, each of which is a user interface element selectable by the user to trigger performance of a corresponding action with respect to the message of the selected chat cell 315. In this example embodiment, the action items 371 are presented in a vertically extending list of respective action cells. An example embodiment of FIG. 3B, the user can save the selected message by selecting the topmost action item 371, or can copy the message by selecting the bottommost action item 371. Note that, in this example embodiment, each action item 371 is provided by the respective action cell, which is selectable at any part thereof. In other embodiments, the action items 371 may be provided by respective icons such as the "save" "copy" icons and text displayed in the example action menu 350 of FIG. 3B.

In this example embodiment, the action menu 350 can be dismissed either by selecting one of the action items 371, or by receiving input from the user indicating dismissal of the action menu. Such dismissal input in this example embodiment comprises tapping anywhere in the chat board 311 in the background.

Figure 4:
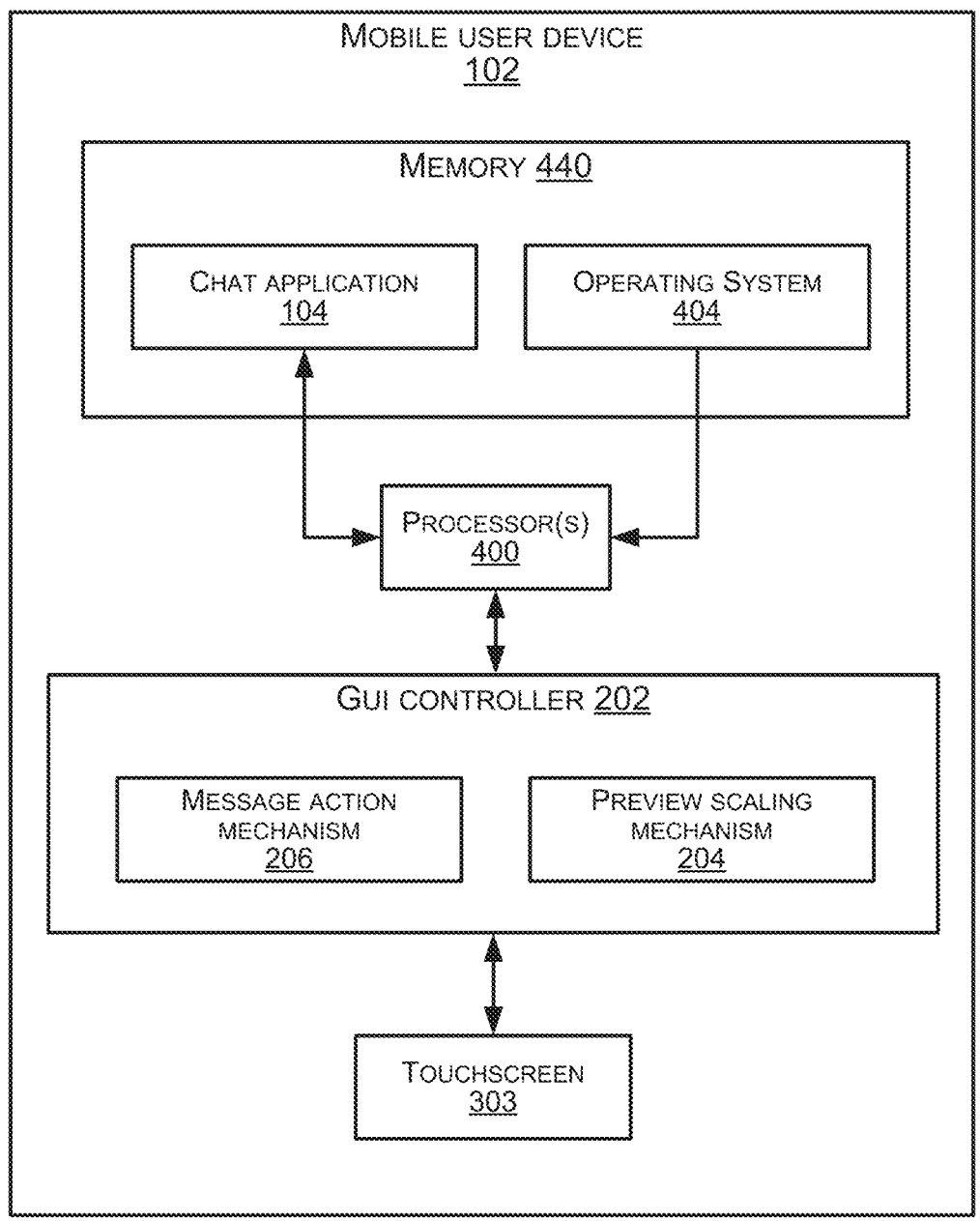
FIG. 4 is a schematic block diagram of a mobile user device configured to provide a graphical user interface for a chat application, according to an example embodiment.

FIG. 4 shows a schematic view of selected functional components of the mobile user device 102 according to an example embodiment in which control of presentation and behavior of the GUI 307 is performed client-side, at the user device 102. As discussed previously, these functions may in other embodiments be performed partly or entirely by server-side devices. The device 102 includes one or more computer processors 400 and memory 440 storing, inter alia, the client-side chat application 104 and a native operating system 404 of the device 102. The previously described GUI controller 202 is in this example embodiment instantiated by execution of the chat application 104 on the processor 400. In this example embodiment, the message action mechanism 206 and the preview scaling mechanism 204 or instantiated as components of the GUI controller 202, when the chat application 104 is executed by the processor.

The preview scaling mechanism 204 is configured to perform automated scaling and positioning of the action menu 350 based at least in part on one or more size and/or position attributes of the selected chat cell 315 that launches the action menu 350. Various aspects of the functionality of the preview scaling mechanism 204 will be evident in view of the description of example methods and embodiments below with reference to FIGS. 5-11.

Figure 5:
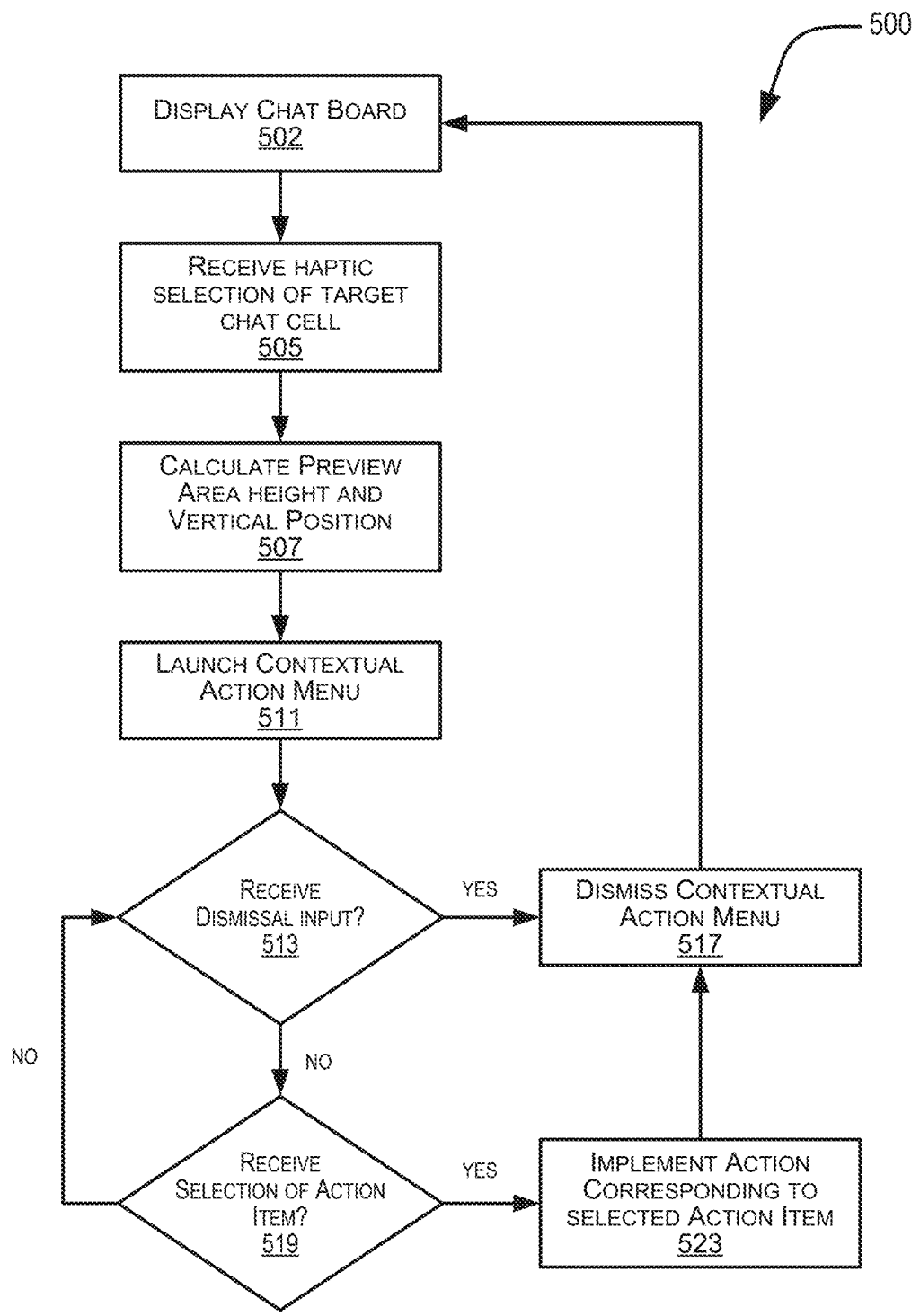
FIG. 5 is a schematic flowchart illustrating a method of providing a chat GUI on a mobile device, according to an example embodiment.
Figure 6:
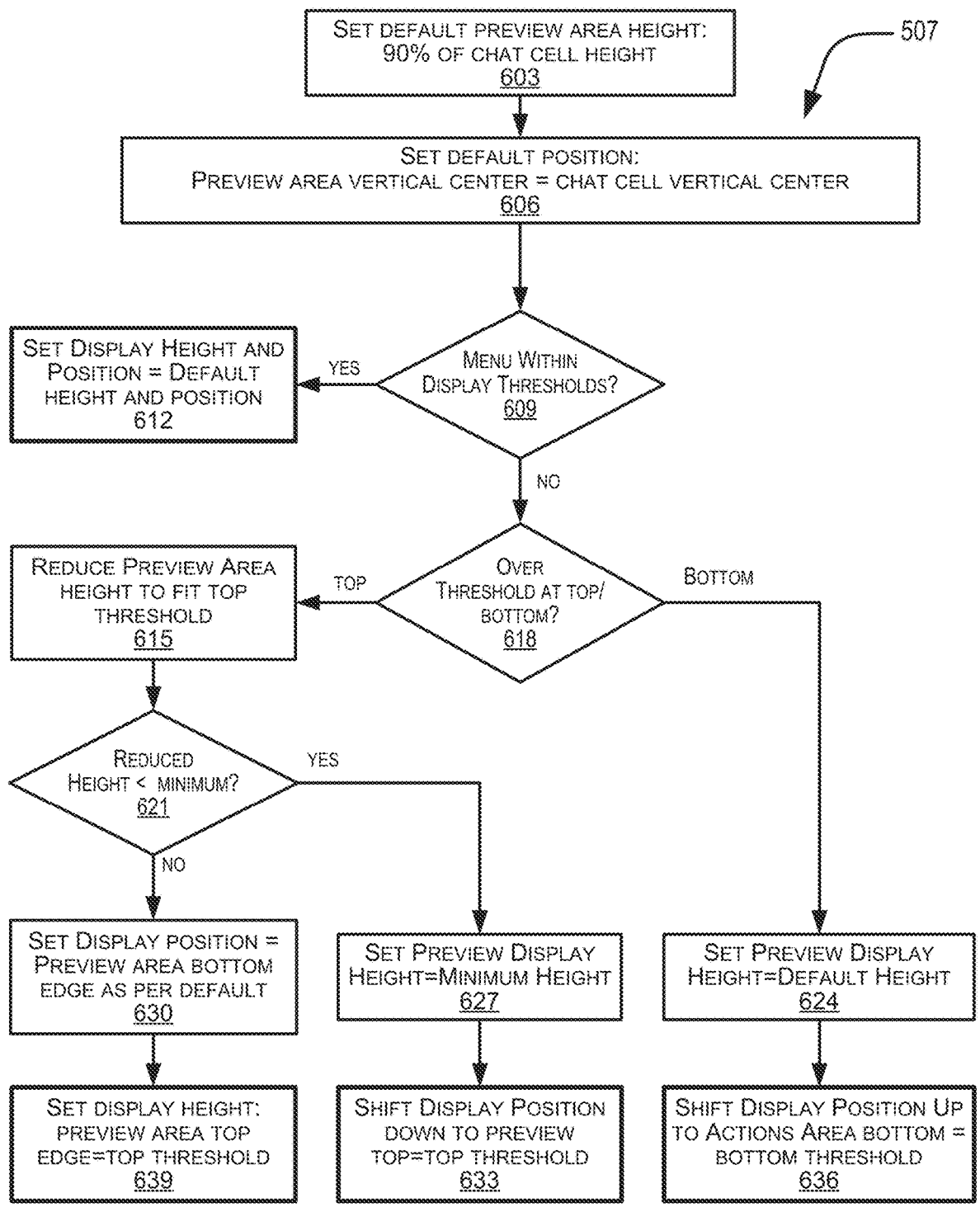
FIG. 6 is a schematic flowchart illustrating a method for determining a variable size and on-screen position of one or more components of a contextual action menu, according to an example embodiment.

FIG. 5 shows a flowchart illustrating an example method 500 for providing an interactive chat user interface, such as the example GUI 307, according to an example embodiment. The operations of the example methods described with reference to FIGS. 5 and 6 are to be understood as being executed by the GUI controller 202 (including the preview scaling mechanism 204 and message action mechanism 206) on the user device 102, according to previously described example embodiments.

At operation 502, the GUI controller 202 causes display of the chat board 311, showing the previously described vertically extending and scrollable series of chat cells 315 with respective chat message content. At operation 505, user input is received in the form of haptic input that indicate selection of a targeted chat cell 315. In this example embodiment, the haptic input can comprise either a tap input on a portion of the chat cell 315 separate from the message preview or message content contained in the chat cell 315 (with a tap input on the message content pulling full-screen display of the relevant message content), or a press and hold input anywhere in the chat cell 315.

Responsive to user selection of a particular chat cell 315, the preview scaling mechanism 204 automatically calculates the display size and position for the preview area 360, and consequently for the action menu 350. In particular, a vertical display height for the preview area 360 and a vertical position for one or more reference points of the action menu 350 and/or preview area 360 are calculated. In this example embodiment, the vertical height and position of the preview area 360 and action menu 350 are determined as a function of attributes of the selected chat cell 315, in particular as a function of the chat cell height and of the vertical scroll position of the chat cell 315 when selected. Rules and logic upon which such automated determination of action menu size and position is based are described in greater detail later herein with reference to FIG. 6.

At operation 511, the GUI controller 202 launches the contextual action menu 350 in a pop-up element overlaid on the chat board 311, as described previously with reference to FIG. 3B. It will be appreciated that the contextual action menu 350 is displayed, at operation 511, with values for its vertical position and its size according to the calculations of operation 507.

If, at operation 513, a dismissal input is received, e.g. comprising a tap input on the background portion surrounding the action menu 350, then the contextual action menu 350 is dismissed, at operation 517, and display of the chat board 311 is resumed, at operation 502.

If, however, selection of one of the action items 371 is received, at operation 519 (e.g., by selection of one of the action cells in the actions area 364), then the corresponding action is implemented by the message action mechanism 206. For example, if the user selects the action item 371 corresponding to saving of the message, then the selected message is saved to the chat board 311. After implementation of the selected action, the contextual action menu 350 is dismissed, at operation 517, and display of the chat board 311 is resumed, at operation 502.

Figure 7:
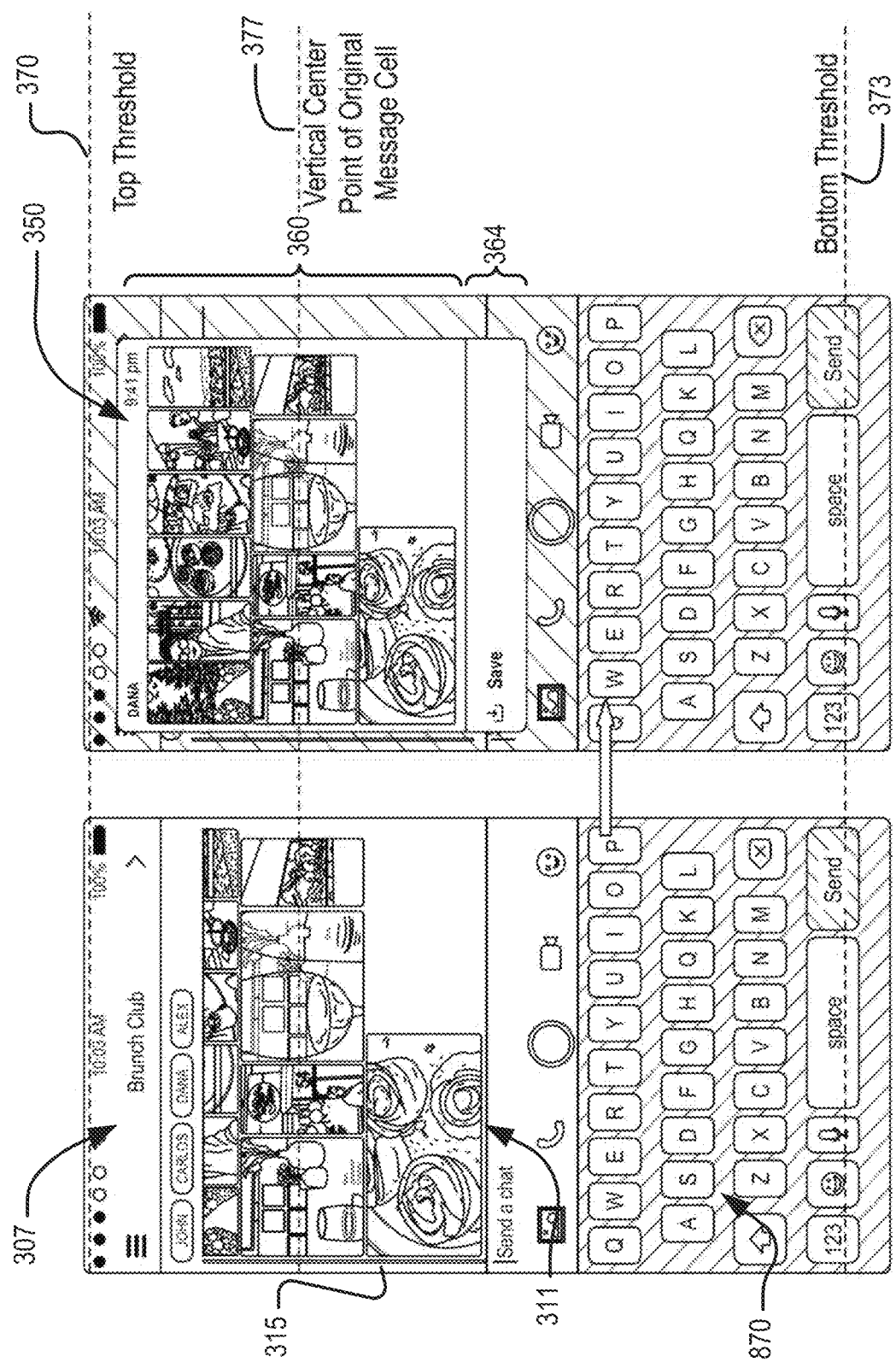
FIG. 7 is a pair of schematic screenshots illustrating an available display area for a contextual action menu in a chat GUI, according to example embodiment.

Turning now to FIG. 6, therein is shown an example flow chart illustrating one example embodiment for the operation 507 of calculating a vertical height for the preview area 360 and a vertical position for components of the action menu 350, according to one example embodiment. In this example embodiment, the preview scaling mechanism 204 implements a standard or default scaling and positioning such that the preview area 360 is at 90% scale of the vertical height of the selected chat cell 315, with the preview area 360 being substantially vertically centered with the vertical center point (see item 377 in FIG. 7) of the selected chat cell 315. This default approach is applied in all instances except where it would result in a vertical extremity of the action menu 350 falling outside of boundaries or thresholds of the available display area. Turning briefly to FIG. 7, therein is shown a bottom threshold 373 and a top threshold 370 for the available display area of the action menu 350. Scaling and positioning of the action menu 350 for such nonstandard situations will be described later herein with reference to FIG. 6.

First, however, we shall consider the standard or default situation. At operation 603 in the method 507 of FIG. 6, a default height for the preview area 360 is set at 90% of the vertical height of the selected chat cell 315. Note that the vertical height of the selected chat cell 315 is in this example embodiment not calculated as the exposed height of the chat cell 315, but as the total height of the chat cell 315 if it were fully exposed. Note also that a different default scaling factor can be employed in other embodiments.

At operation 606, a default position for the preview area 360 is set such that the vertical center of the preview area 360 is aligned with or in register with the vertical center 377 of the selected chat cell 315. Note that the position of the vertical center 377 is determined by its position when selected by the user, and is thus variable from one instance to another. Thus, the on-screen position (and, in nonstandard situations, the on-screen size) of the preview area 360 for a particular chat cell 315 can vary from one instance to another based on variation of its vertical scroll position when selected.

At operation 609, it is determined whether or not the action menu with the preliminary default values fits within the available display area. In other words, it is determined that an upper edge of the action menu 350 will be located below the top threshold 370, and a bottom edge of the action menu 350 will be located above the bottom threshold 373. If both these conditions are satisfied, the standard scaling and positioning rules apply, and, at operation 612, values for a display height of the preview area 360 and the vertical position for the action menu 350 are set to equal the previously calculated default values.

FIG. 7 shows an example embodiment in which the default or standard positioning and scaling applies. Note that an upper edge of the actions area 364 has a vertical position substantially almost in register with to the bottom edge of the selected chat cell 315, being positioned only slightly above it. More particularly, the bottom edge of the selected chat cell 315 vertically intersects the topmost cell or action item 371 of the actions area 364. Display of the action menu 350 includes scaling the message content to fit the scaled preview area 360. In the example embodiment of FIG. 7, the preview content comprises a batch of preview thumbnails, which are respectively scaled to 90% of their size in the chat board 311 prior to selection.

Figure 8A:
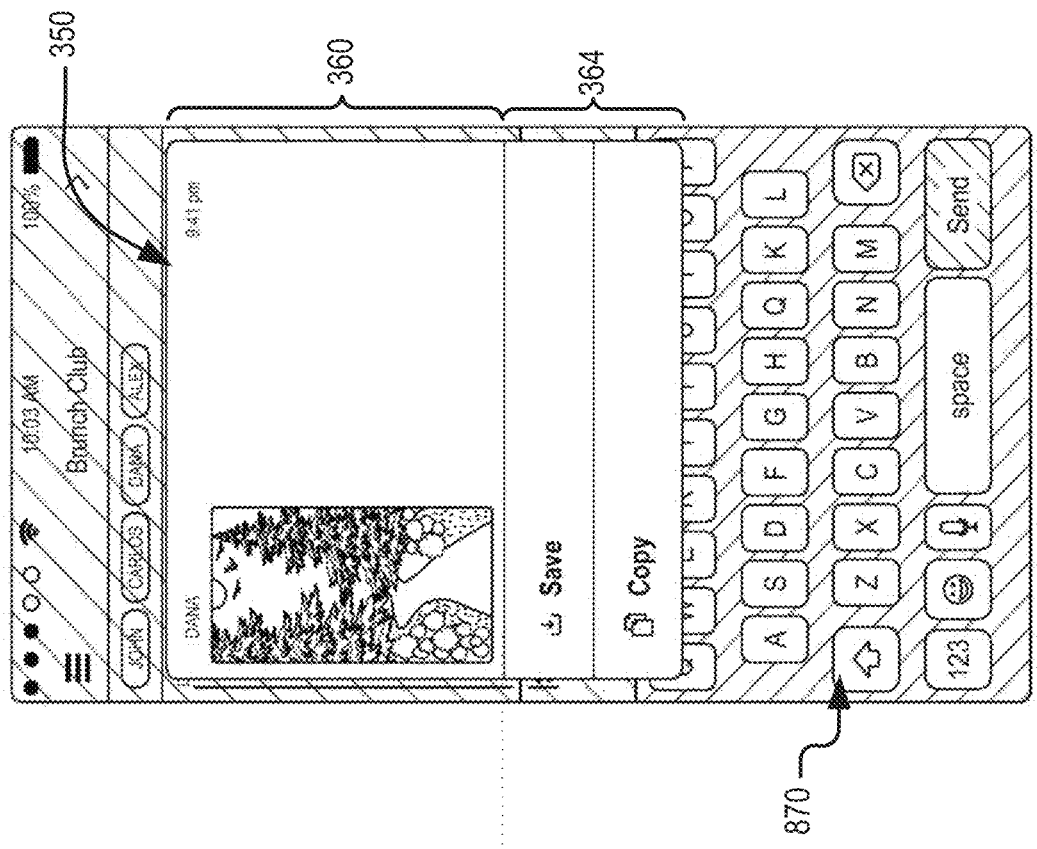
FIGS. 8A-8D show respective screenshots illustrating dynamic sizing and positioning of a contextual chat action menu in a chat GUI with respect to a chat message with photographic message content, according to an example embodiment. Each figure showed a screenshot of a chat board prior to launching of the chat action menu, and a corresponding screenshot after launching of the chat action menu.
Figure 8A:
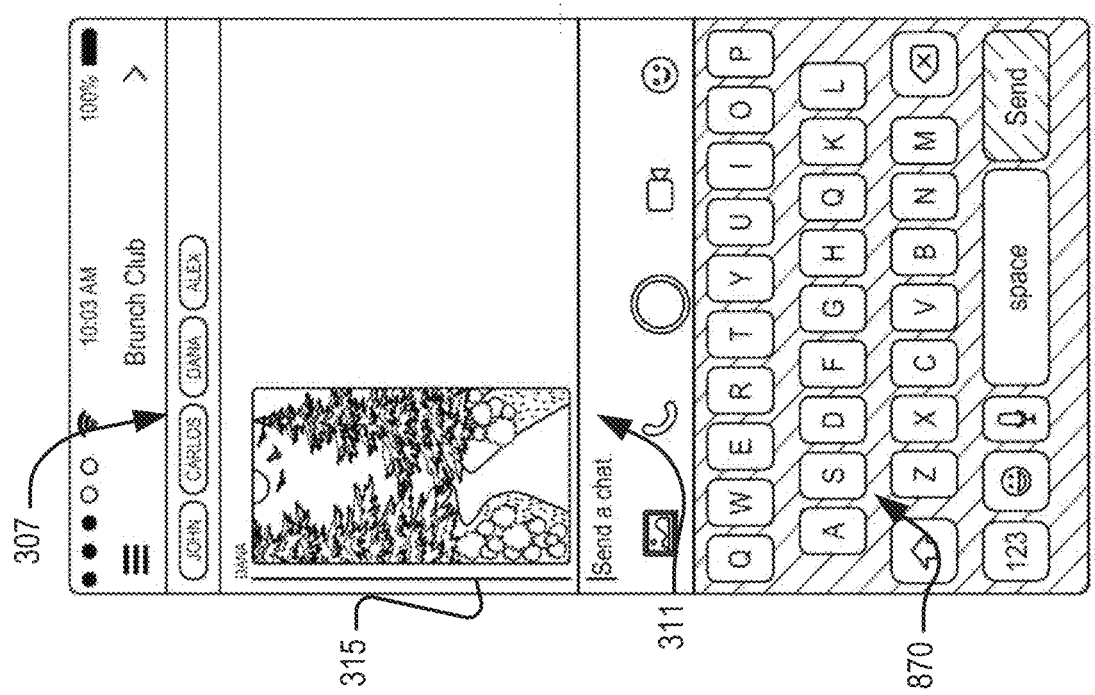
Figure 9A:
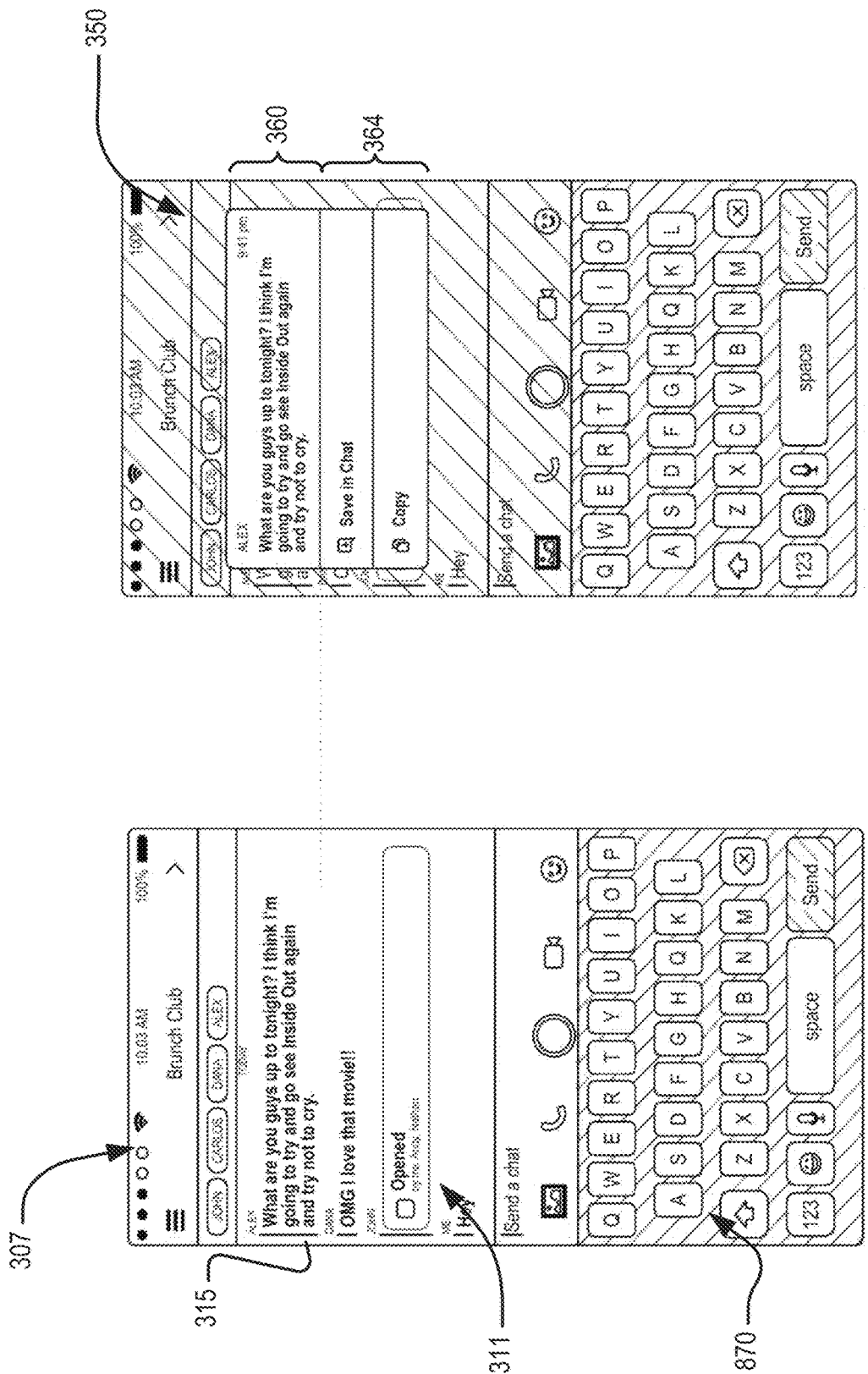
FIGS. 9A-9D show respective screenshots illustrating dynamic sizing and positioning of a contextual chat action menu in a chat GUI with respect to a chat message with text message content, according to an example embodiment. Each figure showed a screenshot of a chat board prior to launching of the chat action menu, and a corresponding screenshot after launching of the chat action menu.
Figure 9C:
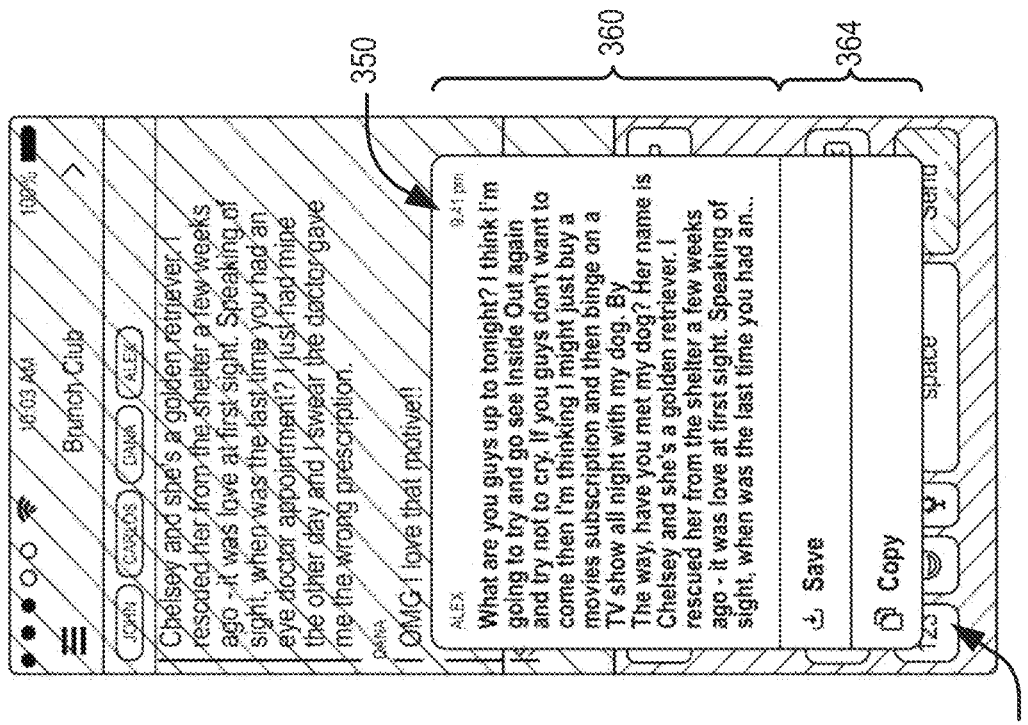
Figure 9C:
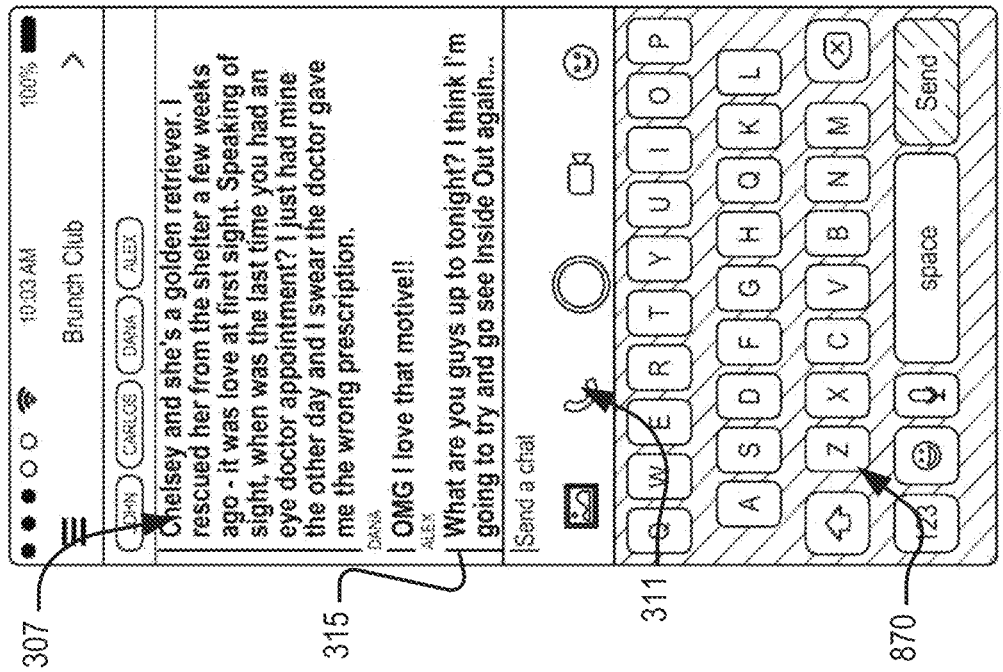
Figure 10A:
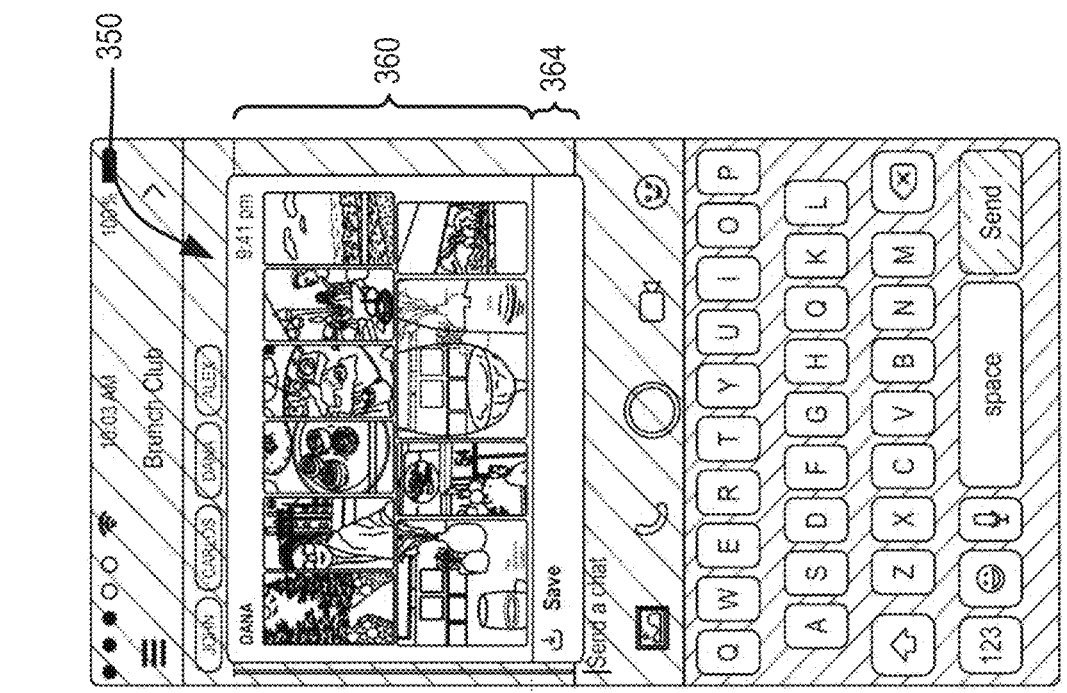
FIGS. 10A-10B show respective screenshots illustrating dynamic sizing and positioning of a contextual chat action menu in a chat GUI with respect to a chat message with a batch of thumbnail images, according to an example embodiment. Each figure showed a screenshot of a chat board prior to launching of the chat action menu, and a corresponding screenshot after launching of the chat action menu.
Figure 10A:
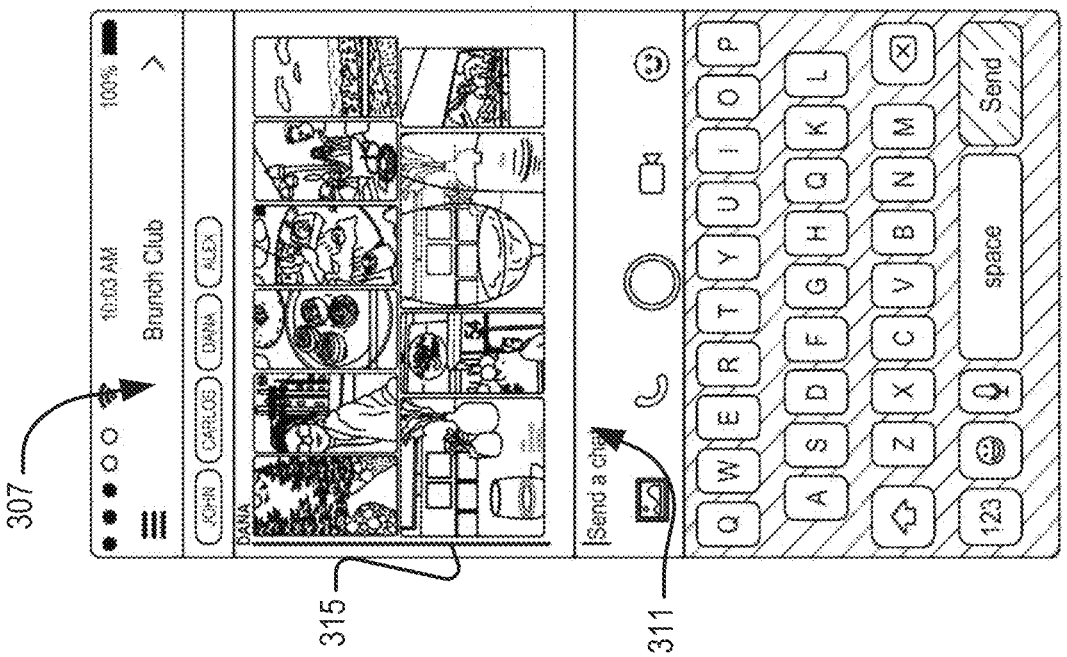

Other example embodiments in which the default position and sizing of the action menu 350 applies include FIG. 8A, which provides a scaled preview thumbnail 369; FIG. 9A, which provides a scaled text preview in which the font in the preview area 360 is scaled to 90% of that in the chat board 311; FIG. 9C; FIG. 10A; and FIG. 10B. Note that, in each of these examples, the bottom edge of the selected chat cell 315 intersects or is adjacent to the topmost cell of the actions area 364. It will be seen from these examples that the vertical position of the action menu 350 varies dependent on the vertical position of the selected chat cell 315. By comparing, for example, FIG. 10A and FIG. 10B, it will be seen that the size of the action menu 350 varies dependent on the vertical extent of the selected chat cell 315. The vertical center positions of the selected chat cells 315 are identical in FIG. 7A and in FIG. 10B, but the vertical size of the preview area 360 is different due to the difference in the vertical size of the respective chat cells 315.

Returning now to FIG. 6, nonstandard instances will be considered. If, at operation 609, it is determined that the action menu 350 with default size and position values will fall outside of the available display area, it is determined, at operation 618, whether or not the default action menu 350 would exceed the top threshold 370 (i.e., if the top edge of the action menu 350 would be above the top threshold 370) or would exceed the bottom threshold 373 (i.e., if the bottom edge of the actions area 364 would fall below the bottom threshold 373). Different approaches apply for top and bottom overshoot.

If the default action menu size and position would result in overshoot of the bottom threshold 373, then the display height for the preview area 360 is, at operation 624, set at the default height (in this example embodiment being 90% of the height of the selected chat cell 315). The position of the preview area 360, however, is adjusted, at operation 636, by being shifted up to make room for all available at action items 371. In other words, the action menu 350 is shifted up into a position where the bottom edge of the actions area 364 is at or close to the bottom threshold 373.

Figure 8B:
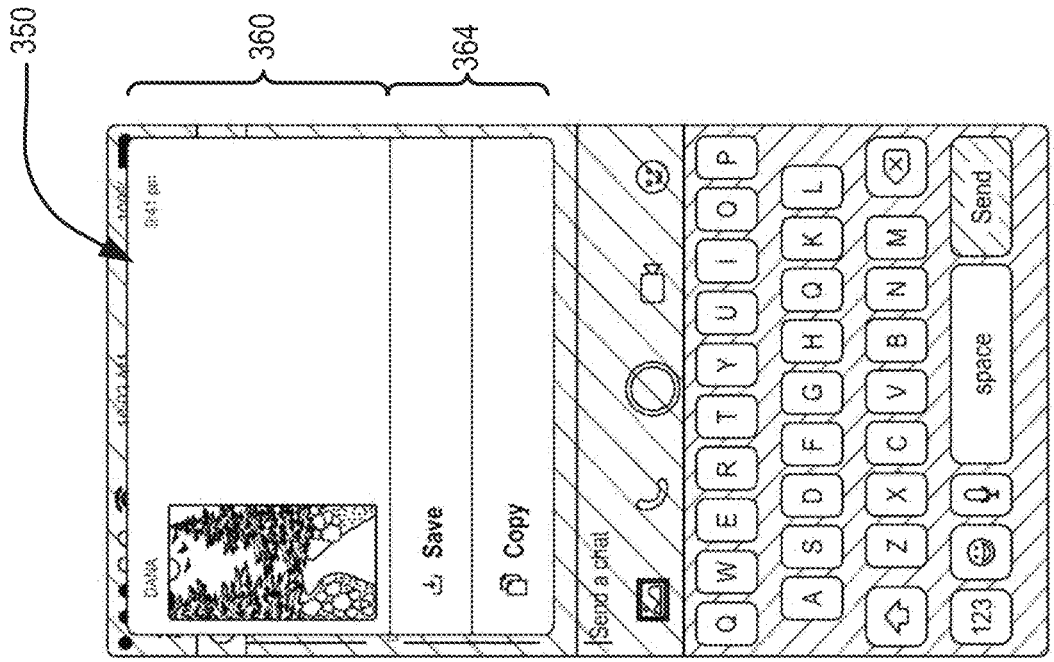
Figure 8B:
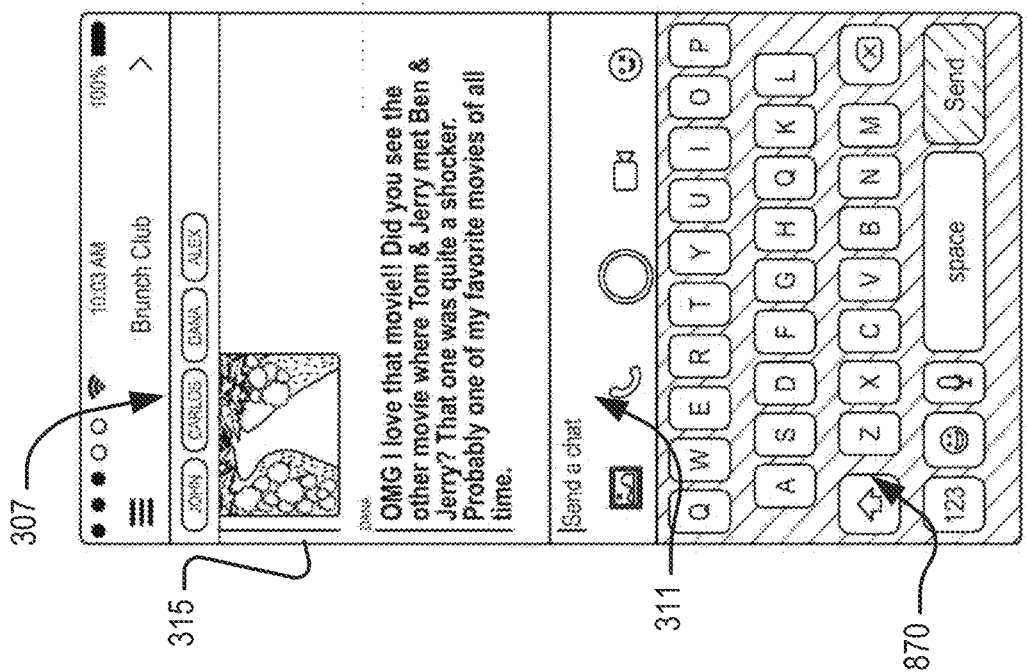
Figure 8C:
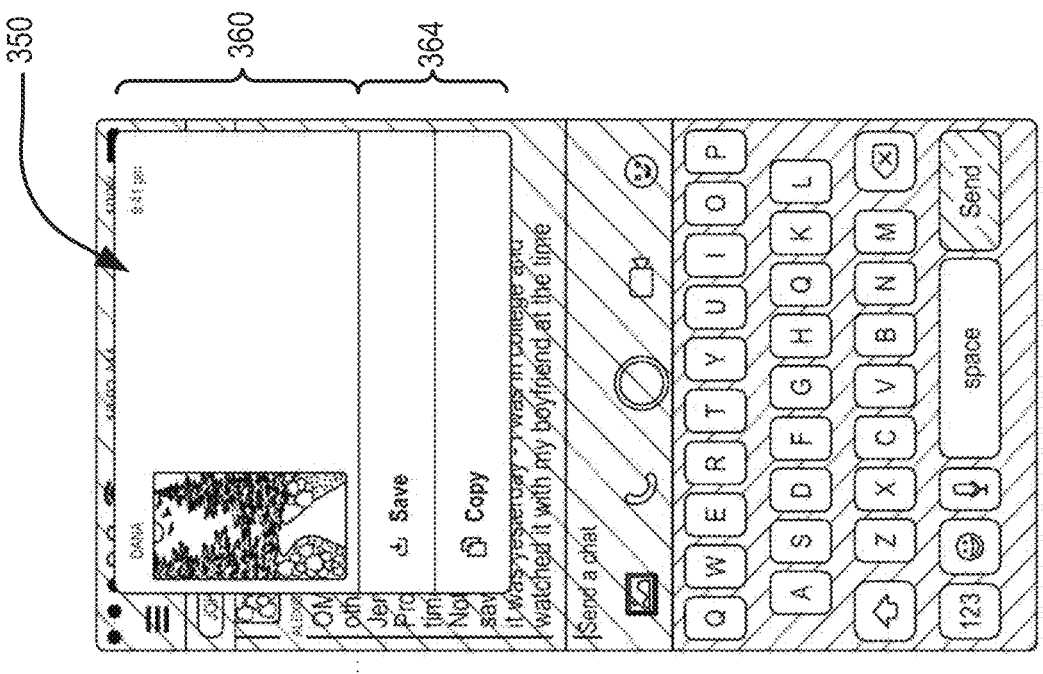
Figure 8C:
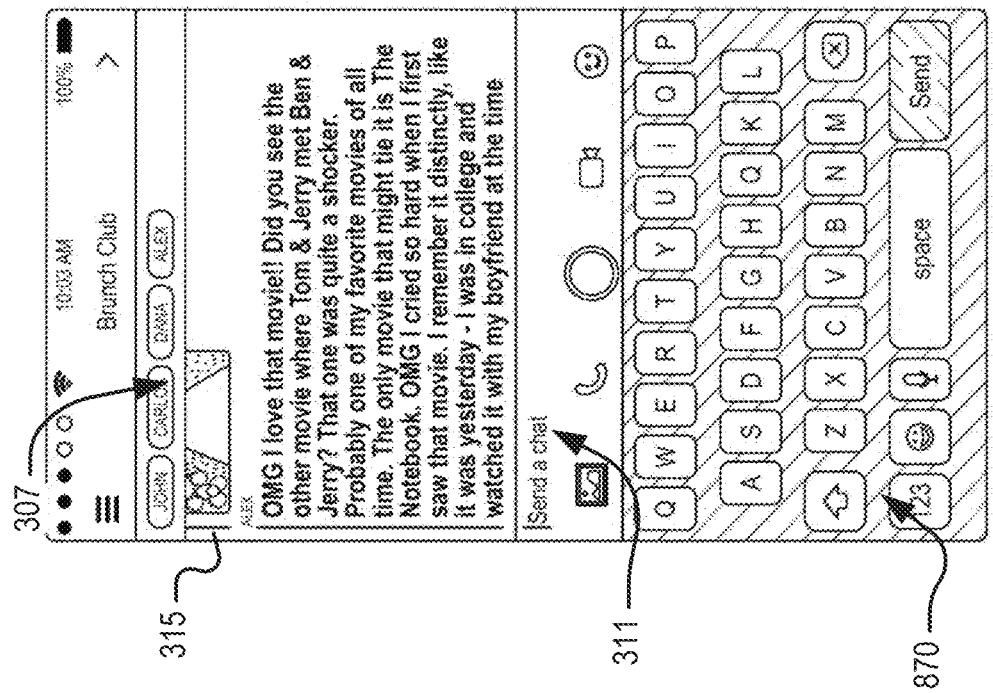
Figure 8D:
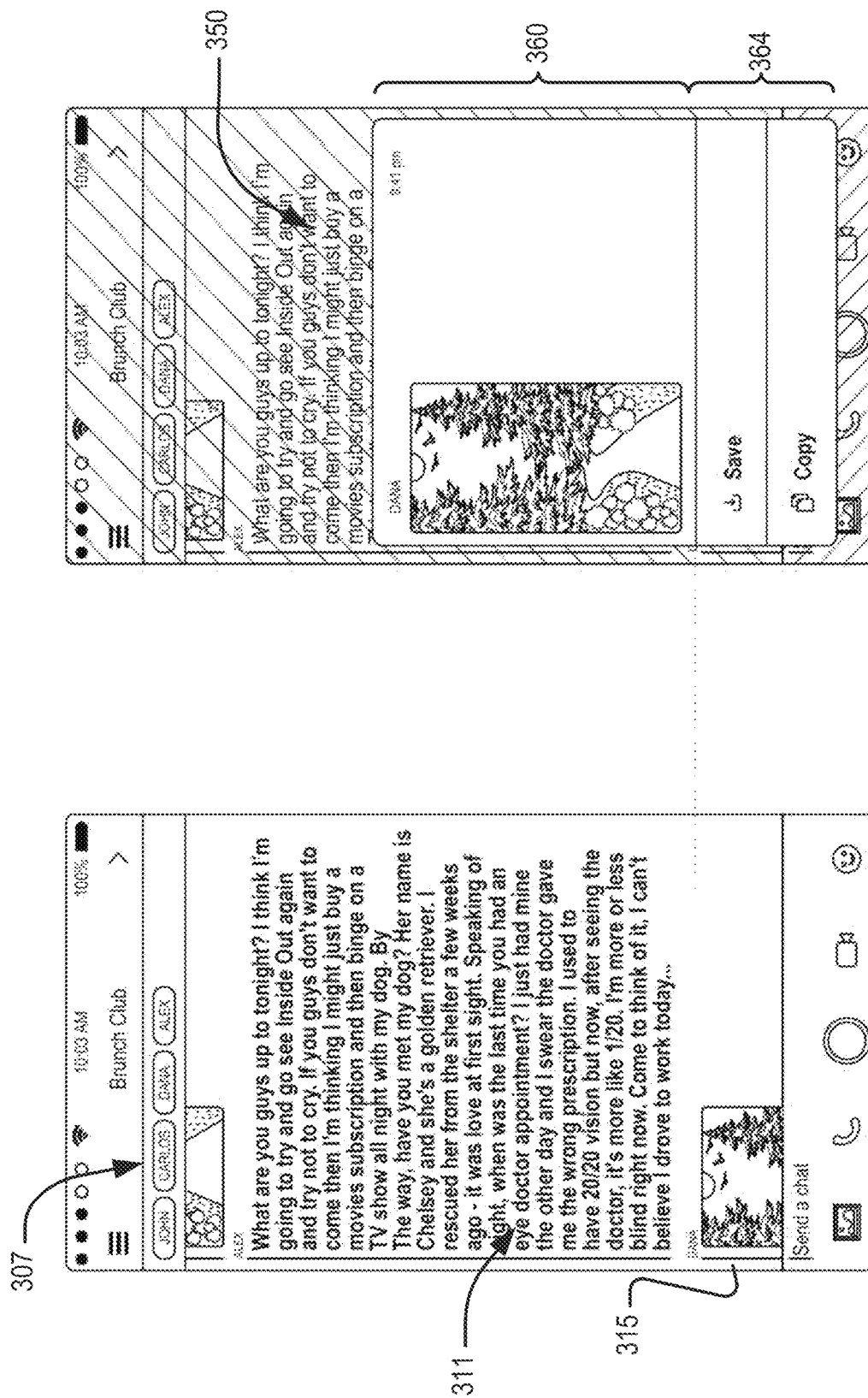

Example embodiments in which the preview area 360 and action menu 350 is scaled and positioned according to bottom overshoot, at operation 636, includes FIG. 8D. Note that in the example embodiment of FIG. 8D, the topmost action item 371 is vertically aligned with the position at which haptic contact with the touchscreen 303 is to occur to select the targeted chat cell 315, which must be close to the bottom threshold 373 in order for bottom overshoot conditions to apply. Thus, minimal vertical movement of the users thumb or finger is again required to select a particular one of the action items 371.

Returning again to the method 507 of FIG. 6, action menu positioning and scaling for top overshoot will now be considered. If, at operation 618, it is determined that, with default values, the top edge of the action menu 350 would fall above the top threshold 370, an available vertical height for the preview area 360 is calculated, at operation 615, with the bottom edge of the preview area 360 held constant from its default position. Worded differently, the vertical distance is calculated between the top threshold 370 and the bottom edge of the preview area 360, according to the default calculations.

Thereafter, it is determined, at operation 621, whether or not the available vertical distance for the preview area 360 thus calculated is smaller than a predefined minimum height, then the display height of the preview area is set, at operation 627, to be equal to the predefined minimum height. At operation 633, the bottom edge of the preview area 360 is shifted down until the top edge of the preview area 360 (with the preview area height equal to the minimum distance) is at the top threshold 370.

An example embodiment of such a top threshold situation in which the preview area 360 is displayed at the predefined minimum size is shown in FIG. 8C. Note that the upper edge of the preview area 360 is equal to the top threshold 370, and that the bottom edge of the preview area 360 is shifted downwards from where it would have been according to the default values, in which it would have been located slightly above the bottom edge of the selected chat cell 315. In particular, compare the relative positions of the bottom edge of the preview area 360 and the bottom edge of the selected chat cell 315 in FIG. 8C and FIG. 8B (in which the vertical size of the preview area 360 is scaled to be located somewhere between the minimum size and the default size).

In this example embodiment, the predefined minimum height for the preview area 360 is determined according to the following equation:

$$\text{Preview } Height_{min} = \frac{Height_{screen}}{3} - 10 - 12.5 - 12.5 - 29 - Height_{Viewers\ Area}$$

wherein:

$$Height_{Viewers\ Area} \begin{cases} 0 & \text{Viewers Area is not showing} \\ 10+ & 12.5 \text{ Viewers area is showing} \end{cases}$$

Figure 11:
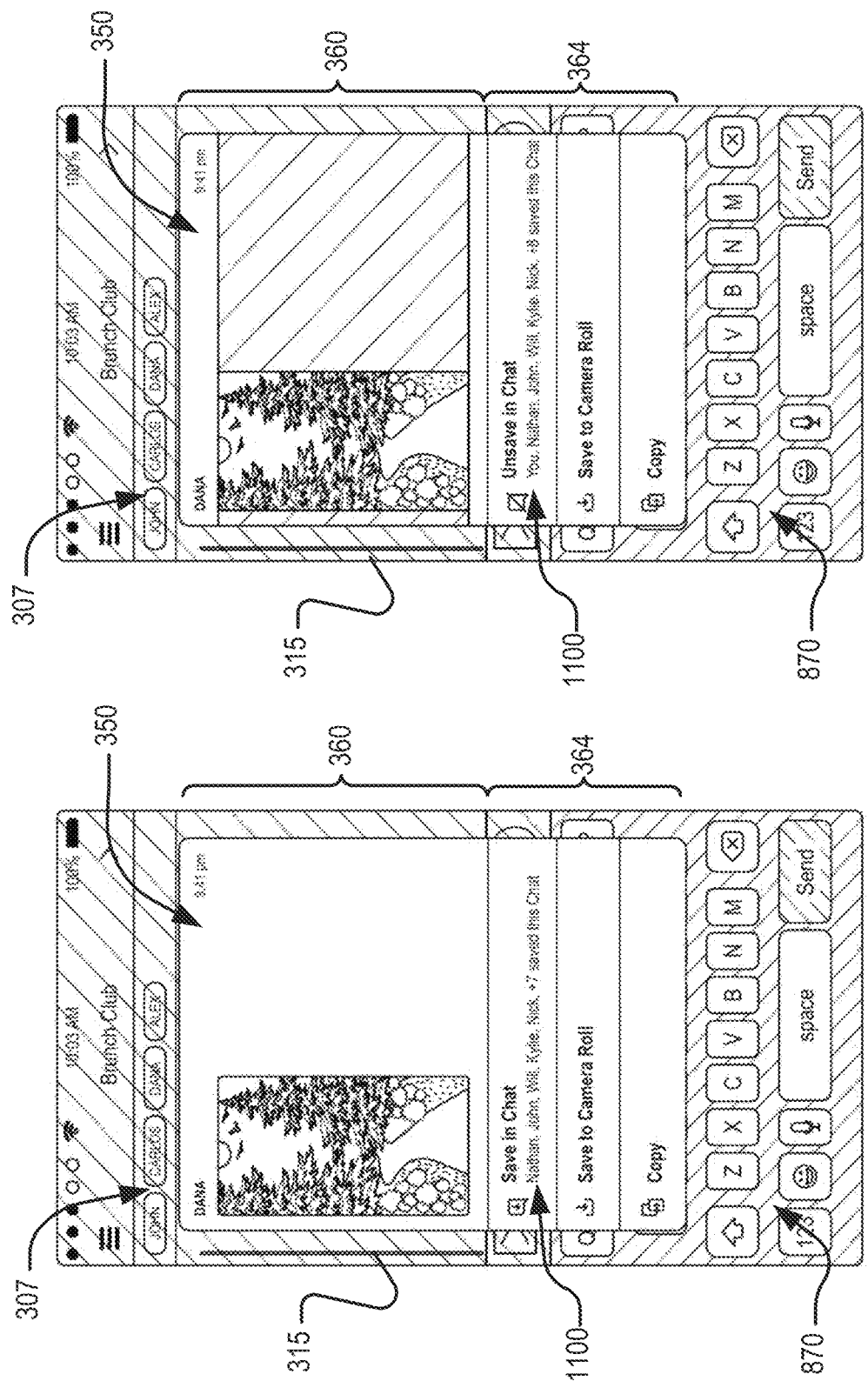
FIG. 11 shows a pair of screenshots of a chat action menu for a chat GUI that includes in the action menu display of metadata indicating identity of users having performed a particular action with respect to the selected chat message, according to an example embodiment

In these calculations, the viewers area is a portion of the actions area 364 of the action menu 350 that can be used for displaying metadata indicating behavior of other users with respect to the selected chat message. FIG. 11 provides an example embodiment in which the viewers area 1100 is located in the topmost action items cell.

The values of the above equation is expressed in point size. It will be appreciated that different embodiments may employ different definitions or equations for calculating the minimum size of the preview area 360.

Returning again to FIG. 6, illustrations for top overshoot for default values, but with above-minimum available height will now be discussed. If, at operation 621, it is determined that the available vertical height for the preview area 360 (with the bottom edge of the preview area 360 maintained at its default position) is larger than the predefined minimum height, then as the display position of the action menu 350 is determined, at operation 630, such that the bottom edge of the preview area 360 is consistent with its vertical position for default values. Thereafter, at operation 639, the height of the preview area 360 is calculated such that the top edge of preview area 360 is at the top threshold 370. The preview area 360 and its contents are thus scaled to have a reduced height that is larger than the minimum height, but is smaller than the default of 90% of the height of the selected chat cell 315.

Figure 9B:
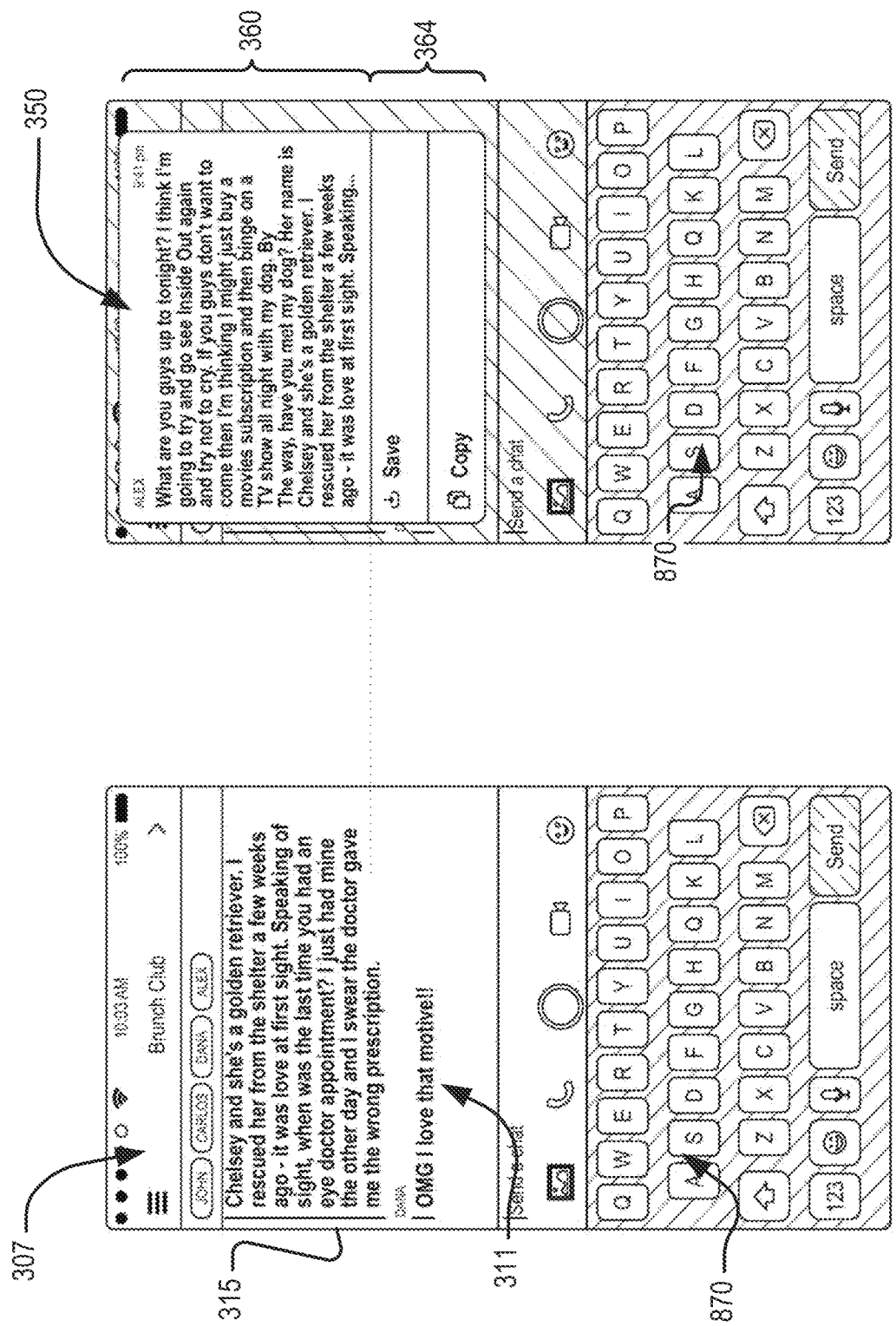
Figure 10B:
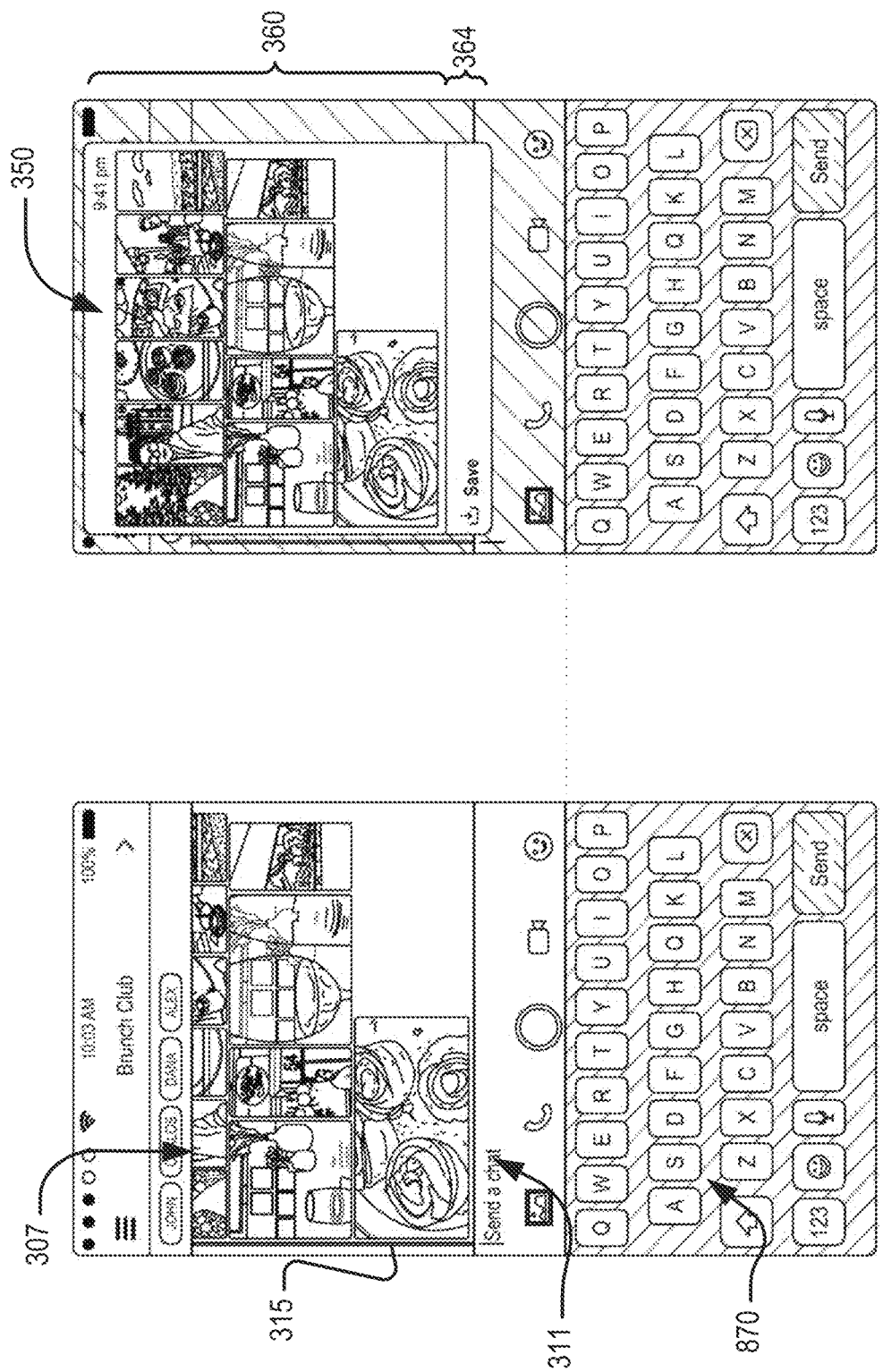

Example embodiments of such above-minimum scaling at the top threshold 370 includes FIG. 8B, FIG. 9B, and FIG. 10B. Note, in particular, that in each of these instances, the bottom edge of the preview area 360 is in its default position, in which the cell of the topmost action item 371 is in vertical register with the bottom edge of the selected chat cell 315.

Figure 9D:
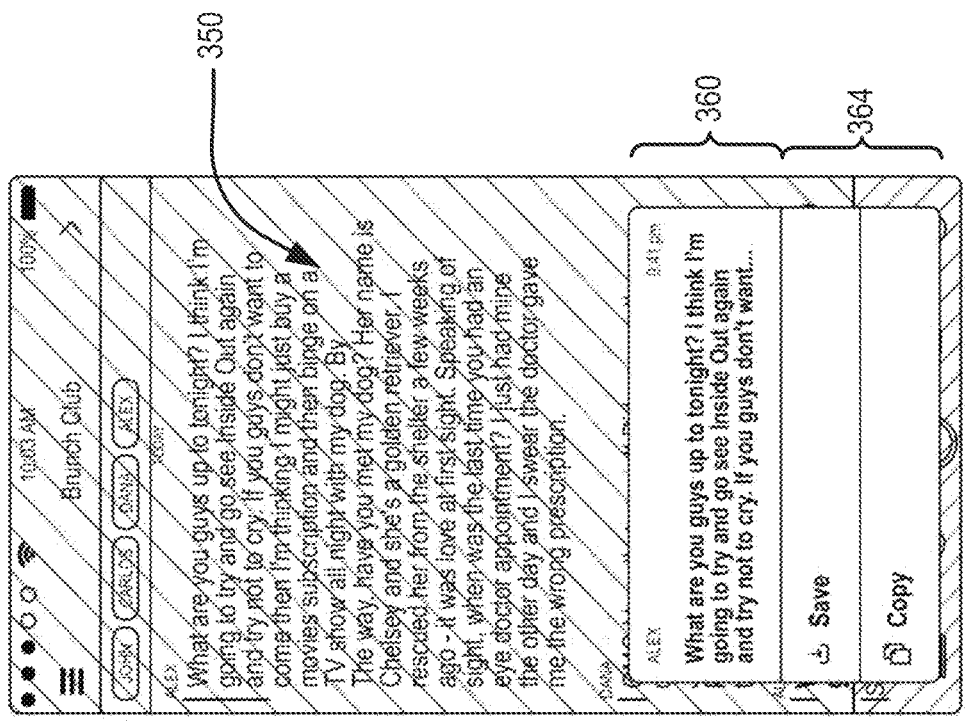
Figure 9D:
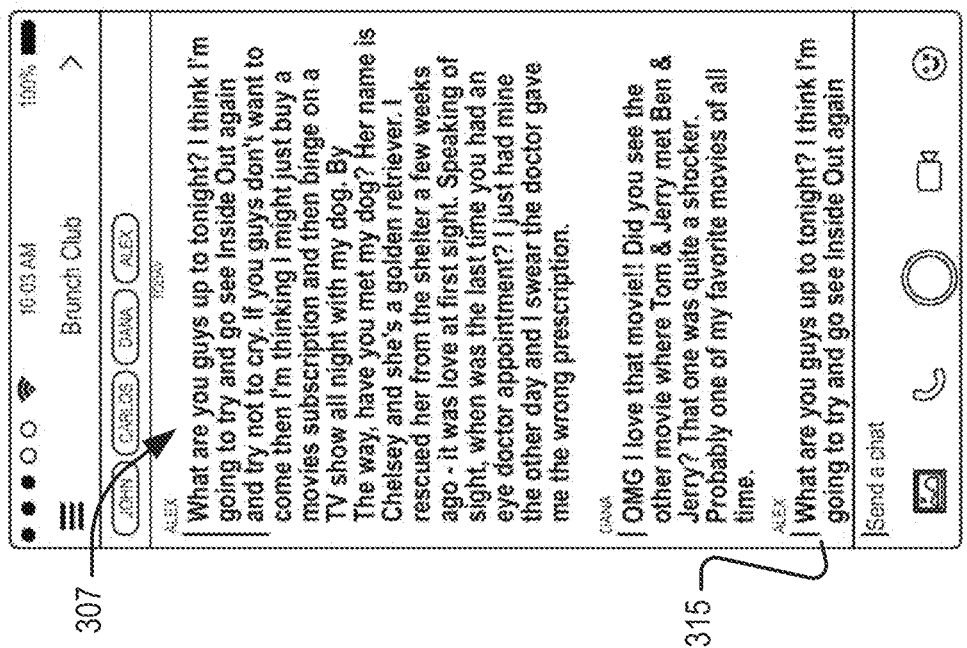

FIG. 9D illustrates a different example embodiment where bottom overshoot cause display of the preview area 360 not at its default height (90% of chat cell height), but at the predefined minimum height. Also evident from the example embodiments of FIGS. 9A-9D is that scaling of text messages comprises reduction of font size to a predefined minimum value, after which a text string of the message is truncated or ellipsized to provide more contracted height reductions than can legibly be achieved with font scaling.

It will also be noted with reference to the example embodiments of FIG. 8A, FIG. 9C, and FIG. 11 that the scaling and positioning of the action menu 350 is unaffected by whether or not an on-screen keyboard 870 is displayed in the chat board 311. In cases where the calculated action menu position coincides with part of the keyboard 870, the action menu 350 is displayed the keyboard 870.

It will be appreciated that the above-described automatic scaling of the action menu 350 is in most instances such that the selectable action items has a constant vertical distance from a reference point, e.g., the vertical center point or the bottom edge of the selected chat cell 315. The techniques thus disclosed provides that the actions area 364 in most instances animate to a position of that the user comes to expect, which is of importance in for usability purposes of users working at speed. In this manner, functioning of the user device 102 and the GUI 307 is improved by the described automatic scaling and positioning of the contextual action menu 350. Note that the on-screen distance that a user's haptic contact (e.g. a thumb press on a touchscreen) has to travel in order to select the topmost action item in the actions area 364 subsequent to activation of the action menu 350 by selecting the targeted chat cells 315 will be substantially constant.

In summary, the techniques of FIG. 6 provides for displaying in standard instances the preview area 360 and therefore the message preview at 90% of the original chat cell size. However, if the selected chat cell 315 it is scrolled near the top of the screen when the contextual action menu 350 is triggered, the message preview is scaled smaller in order to (a) keep the action menu 350 completely visible on the touchscreen 303, and (b) to keep the actions area 364 within ready finger's reach.

For text messages, the message preview is by default again displayed at 90% of its original size. However, if the chat cells 315 is scrolled near the top of the touchscreen 303 when the action menu 350 is triggered, the message preview may be truncated rather than being scaled further.

Note that there are two different haptic inputs that can be provided for triggering the contextual action menu 350: tap or press-and-hold. Selection of the action items 371 vary depending on the method used to trigger showing of the action menu 350. For example, if the action menu 350 is launched by a press-and-fold, the finger is dragged to an action item 371 and then released to select it. Alternatively, if the action menu 350 is launched via tap, the user can simply tap on an action item 371 to select it.

Will be appreciated that the action menus 350 for different types of messages (e.g., texts, snaps, media, etc.) are automatically surfaced with different available action items 371. Some message types do not support any actions. Other message types (e.g. status messages) do not support showing of the action menu 350 at all.

If the message content supports a press-and-hold gesture or a tap gesture (e.g., tapping image content to launch full-screen view, tapping audio icons to trigger audio replay, press-and-hold to replay a video-based ephemeral message or Snap) then haptic input for action menu triggering is recognized only in areas of the chat cells 315 that are not part of the message contents.

Machine and Software Architecture

These systems, system components, methods, applications and so forth described in conjunction with FIGS. 1-11 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines configured for particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. The software and hardware architectures presented here are example architectures for implementing the disclosure, are is not exhaustive as to possible architectures that can be employed for implementing the disclosure.

Software Architecture

Figure 12:
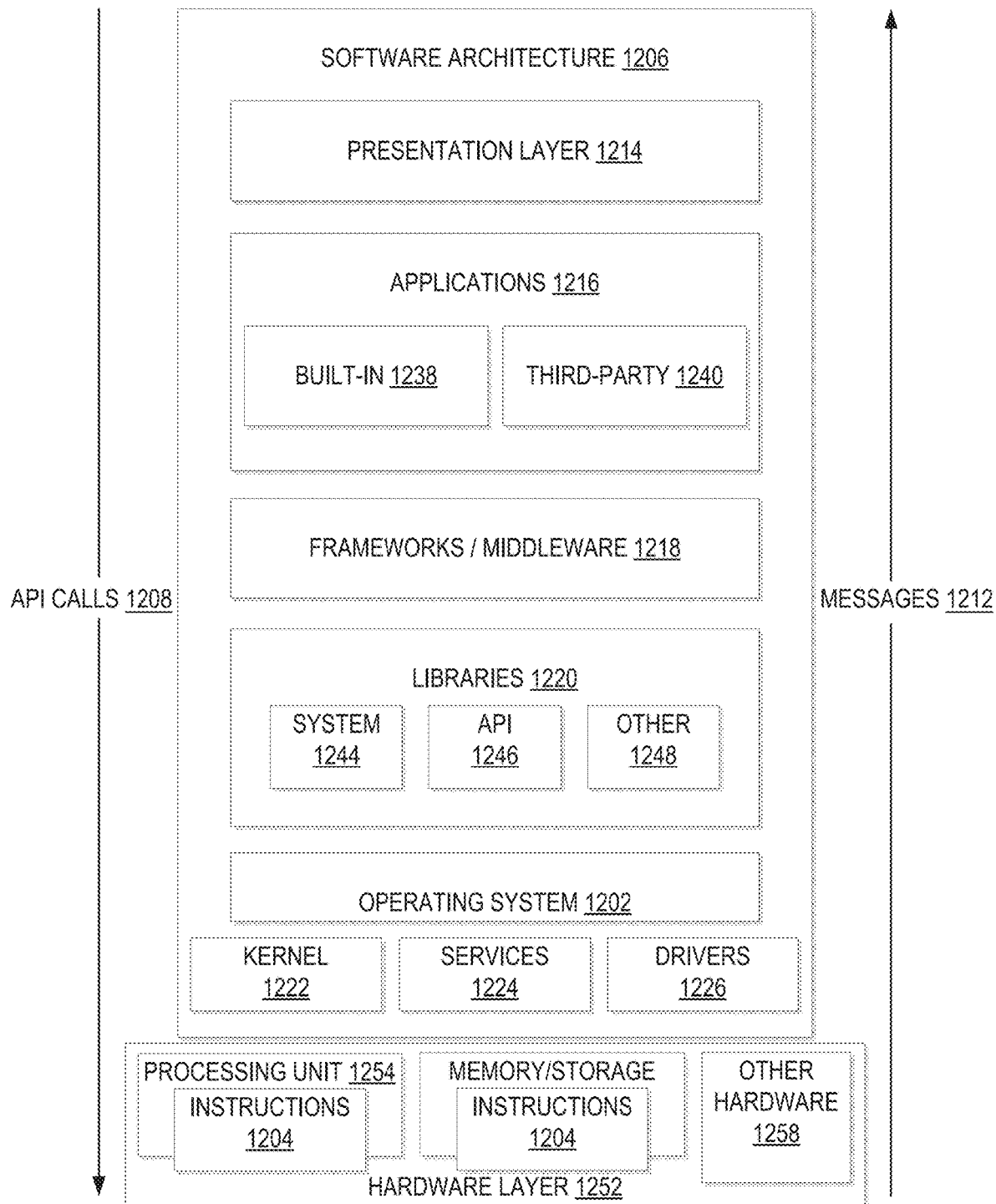
FIG. 12 is a block diagram illustrating an example of a software architecture that may be installed on a machine to provide for a specially configured system to provide a contextual action menu in a graphical user interface for a chat application, according to some example embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as machine 1300 of FIG. 13 that includes, among other things, processors 1304, memory 1314, and input/output (I/O) components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216, frameworks/middleware 1218 and a presentation layer 1214. Operationally, the applications 1216 and/or other components within the layers may invoke API calls 1208 through the software stack and receive a response 1212 to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Hardware Architecture

Figure 13:
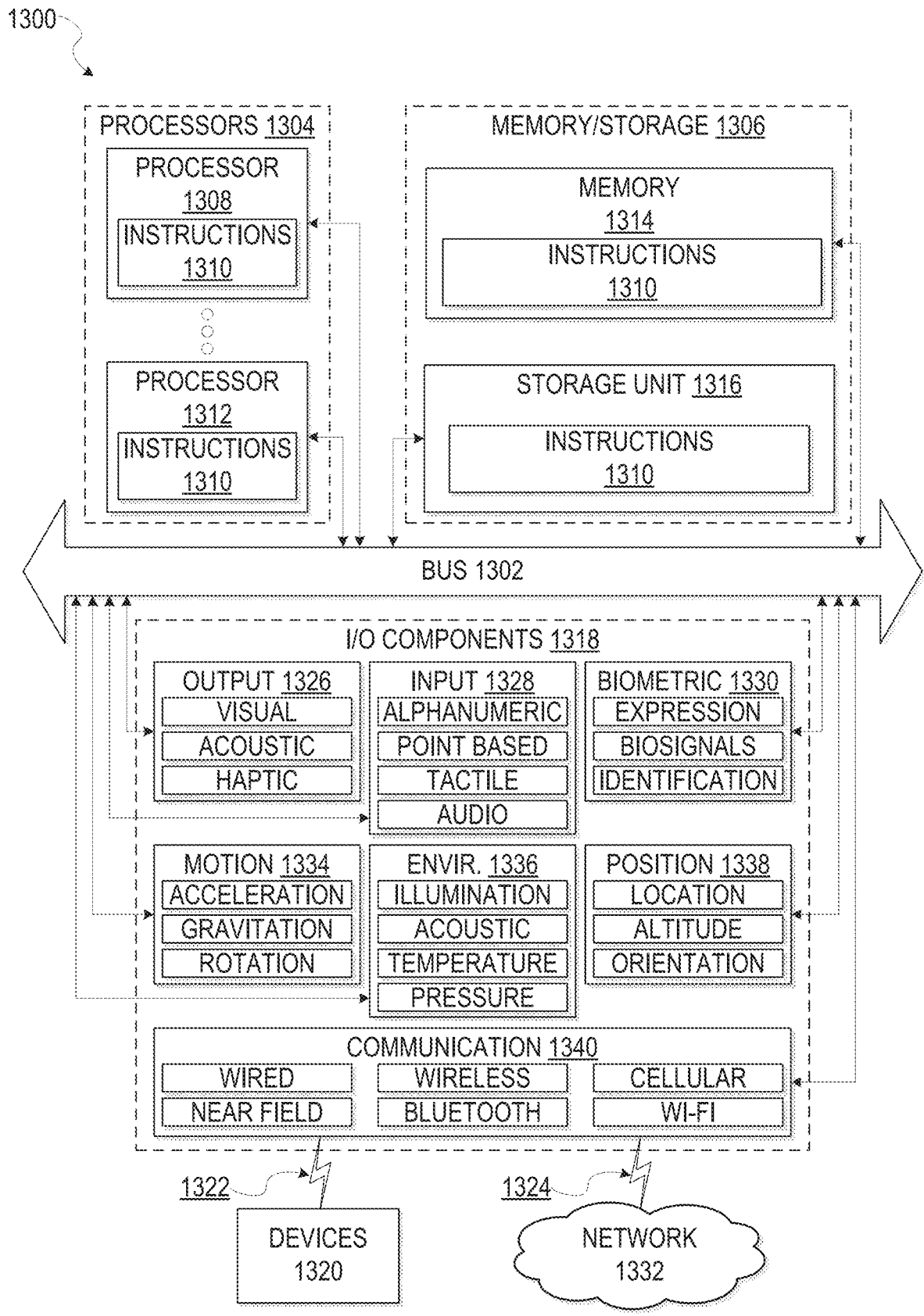
FIG. 13 is a diagrammatic representation of a machine in the example form of a computer system within which a set of instructions may be executed for causing the machine to perform any one or more of the methodologies discussed herein, according to an example embodiment. In some example embodiments, execution of the set of instructions by the machine may provide the machine with a GUI controller, a preview scanning mechanism, and/or a message action mechanisms, as described herein with respect to different example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304 (e.g., an array of processors 1208-1212, memory memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1322 and coupling 1324, respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory. "Snaps" as referenced in the description are ephemeral messages.

"MACHINE-READABLE MEDIUM" in this context refers to a component, device, or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, unless that the context and/or logic clearly indicates otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. The specification and drawings are, accordingly, to be regarded in an illustrative rather than a restrictive sense.

What is claimed is:

1. A method comprising:
   causing display of a GUI for a chat application on a mobile user device, the GUI including a series of message cells, each message cell corresponding to a respective message;
   receiving a user input indicating selection of a first message cell from the series of message cells;
   calculating a display scale of a preview area for displaying text included in a first message corresponding to the first message cell;
   determining whether the text displayed at a predetermined minimum font size fits within the preview area at the display scale; and
   based on determining that the text displayed at the minimum font size does not fit within the preview area at the display scale, generating a text preview for the first message based on the display scale for the preview area, the text preview comprising a text string that is ellipsized and that comprises a truncated portion of a whole text string of the first message;
   in response to and conditional on the user input for selection of the first message cell, launching a contextual action menu overlaid on the series of message cells, the contextual action menu comprising the preview area and one or more action items that are selectable to cause performance of corresponding actions with respect to the first message, the preview area being presented at the display scale and displaying the text preview, textual information accessible via the preview area being limited to the text preview.

2. The method of claim 1, wherein the calculating of the display scale is such that on-screen size of the preview area is variable from one instance of launching the contextual action menu to another as a factor of one or more on-screen display attributes of the first message cell.

3. The method of claim 2, wherein the one or more on-screen display attributes of the first message cell that affect the on-screen size of the preview area includes a height of the first message cell.

4. The method of claim 2, wherein the calculating of the display scale includes calculating an on-screen position of the preview area as a factor of the one or more on-screen display attributes of the selected message cell.

5. The method of claim 4, wherein the series of message cells extends vertically on-screen and is vertically scrollable, and wherein calculating the on-screen position comprises calculating a vertical position of the contextual action menu.

6. The method of claim 5, wherein the contextual action menu spans more than 90% of a horizontal span of available screen area on which the series of message cells is displayed.

7. The method of claim 5, wherein the one or more on-screen display attributes of the first message cell upon which determination of the vertical position of the contextual action menu is based includes a vertical position of the first message cell when selected by the user input.

8. The method of claim 1, further comprising:
   subsequent to removal from display of the contextual action menu for the first message, receiving a user input indicating selection of a second message cell from the series of message cells;
   calculating a display scale of a preview area for displaying text included in a second message corresponding to the second message cell;
   determining that the text of the second message displayed at a predetermined minimum font size fits within the preview area at the display scale; and
   launching, overlaid on the series of message cells, a contextual action menu specific to the second message, the contextual action menu comprising the preview area and one or more action items that are selectable to cause performance of corresponding actions with respect to the second message, the preview area being presented at the display scale and including a whole text string of the second message at a font size equal to or greater than the minimum font size.

9. The method of claim 1, further comprising, while the contextual action menu is displayed, rendering a background provided by an exposed portion of the series of message cells in a dimmed mode.

10. A system comprising:
one or more computer processor devices; and
memory having stored thereon instructions that, when executed by the one or more computer processor devices, configure the system to perform operations comprising:
  causing display of a GUI for a chat application on a mobile user device, the GUI including a series of message cells, each message cell corresponding to a respective message;
  receiving a user input indicating selection of a first message cell from the series of message cells;
  calculating a display scale of a preview area for displaying text included in a first message corresponding to the first message cell;
  determining whether the text displayed at a predetermined minimum font size fits within the preview area at the display scale; and
  based on determining that the text displayed at the minimum font size does not fit within the preview area at the display scale, generating a text preview for the first message based on the display scale for the preview area, the text preview comprising a text string that is ellipsized and that comprises a truncated portion of a whole text string of the first message;
  in response to and conditional on the user input for selection of the first message cell, launching a contextual action menu overlaid on the series of message cells, the contextual action menu comprising the preview area and one or more action items that are selectable to cause performance of corresponding actions with respect to the first message, the preview area being presented at the display scale and displaying the text preview, textual information accessible via the preview area being limited to the text preview.

11. The system of claim 10, wherein the instructions configure the system to perform the calculating of the display scale such that on-screen size of the preview area is variable from one instance of launching the contextual action menu to another as a factor of one or more on-screen display attributes of the first message cell.

12. The system of claim 11, wherein the one or more on-screen display attributes of the first message cell that affect the on-screen size of the preview area includes a height of the first message cell.

13. The system of claim 11, wherein the instructions configure the system such that the calculating of the display scale includes calculating an on-screen position of the preview area as a factor of the one or more on-screen display attributes of the selected message cell.

14. The system of claim 13, wherein the series of message cells extends vertically on-screen and is vertically scrollable, and wherein the instruction configure the calculating the on-screen position to comprise calculating a vertical position of the contextual action menu.

15. The system of claim 14, wherein the contextual action menu spans more than 90% of a horizontal span of available screen area on which the series of message cells is displayed.

16. The system of claim 14, wherein the one or more on-screen display attributes of the first message cell upon which determination of the vertical position of the contextual action menu is based includes a vertical position of the first message cell when selected by the user input.

17. The system of claim 10, wherein the instructions configure the system to perform to perform further operations comprising:
  subsequent to removal from display of the contextual action menu for the first message, receiving a user input indicating selection of a second message cell from the series of message cells;
  calculating a display scale of a preview area for displaying text included in a second message corresponding to the second message cell;
  determining that the text of the second message displayed at a predetermined minimum font size fits within the preview area at the display scale; and
  launching, overlaid on the series of message cells, a contextual action menu specific to the second message, the contextual action menu comprising the preview area and one or more action items that are selectable to cause performance of corresponding actions with respect to the second message, the preview area being presented at the display scale and including a whole text string of the second message at a font size equal to or greater than the minimum font size.

18. The system of claim 10, wherein the instructions configure the system such that, while the contextual action menu is displayed, rendering a background provided by an exposed portion of the series of message cells in a dimmed mode.

19. A non-transitory computer-readable storage medium having stored thereon instructions that, when executed by one or more computer processor devices, cause the one or more computer processor devices to perform operations comprising:
  causing display of a GUI for a chat application on a mobile user device, the GUI including a series of message cells, each message cell corresponding to a respective message;
  receiving a user input indicating selection of a first message cell from the series of message cells;
  calculating a display scale of a preview area for displaying text included in a first message corresponding to the first message cell;
  determining whether the text displayed at a predetermined minimum font size fits within the preview area at the display scale; and
  based on determining that the text displayed at the minimum font size does not fit within the preview area at the display scale, generating a text preview for the first message based on the display scale for the preview area, the text preview comprising a text string that is ellipsized and that comprises a truncated portion of a whole text string of the first message;
  in response to and conditional on the user input for selection of the first message cell, launching a contextual action menu overlaid on the series of message cells, the contextual action menu comprising the preview area and one or more action items that are selectable to cause performance of corresponding actions with respect to the first message, the preview area being presented at the display scale and displaying the text preview, textual information accessible via the preview area being limited to the text preview.

* * * * *